US012034495B2

(12) United States Patent
Kudo et al.

(10) Patent No.: US 12,034,495 B2
(45) Date of Patent: Jul. 9, 2024

(54) SYSTEM, DEVICE, METHOD AND PROGRAM THAT PREDICT COMMUNICATION QUALITY

(71) Applicant: NIPPON TELEGRAPH AND TELEPHONE CORPORATION, Tokyo (JP)

(72) Inventors: Riichi Kudo, Musashino (JP); Kahoko Takahashi, Musashino (JP); Kohei Mizuno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 145 days.

(21) Appl. No.: 17/802,088

(22) PCT Filed: Feb. 25, 2020

(86) PCT No.: PCT/JP2020/007361
§ 371 (c)(1),
(2) Date: Aug. 24, 2022

(87) PCT Pub. No.: WO2021/171341
PCT Pub. Date: Sep. 2, 2021

(65) Prior Publication Data
US 2023/0079581 A1 Mar. 16, 2023

(51) Int. Cl.
*H04B 17/391* (2015.01)
*H04B 17/373* (2015.01)
*H04W 24/00* (2009.01)

(52) U.S. Cl.
CPC ....... *H04B 17/3913* (2015.01); *H04B 17/373* (2015.01); *H04W 24/00* (2013.01)

(58) Field of Classification Search
CPC .. H04B 17/3913; H04B 17/373; H04W 24/00
See application file for complete search history.

(56) References Cited

U.S. PATENT DOCUMENTS

2019/0207672 A1 7/2019 Arora et al.

FOREIGN PATENT DOCUMENTS

JP 2008278004 A 11/2008

OTHER PUBLICATIONS

Christopher J. Lowrance, Adrian P. Lauf, "An active and incremental learning framework for the online prediction of link quality in robot networks". Engineering Applications of Artificial Intelligence, vol. 77, 2019. pp. 197-211.

*Primary Examiner* — Natasha W Cosme
(74) *Attorney, Agent, or Firm* — Harness, Dickey & Pierce, P.L.C.

(57) ABSTRACT

An object of the present disclosure is to enable prediction of communication quality in accordance with wireless communication under frequency conditions as combinations of frequencies and frequency bandwidths.
The present disclosure provides a system including: an environment information generation unit configured to generate environment information of a terminal that performs wireless communication; a communication prediction model storage unit configured to store a plurality of communication prediction models obtained by learning relationships between the environment information and communication quality of wireless communication under frequency channel conditions; a communication prediction model generation unit configured to select one or more communication prediction models from among the plurality of communication prediction models and use the selected communication prediction models to generate a communication prediction model; and a communication prediction unit configured to input the environment information generated by the environment information generation unit to the communication prediction model generated by the communication predic- (Continued)

tion model generation unit and predict current or future communication quality of the terminal.

8 Claims, 16 Drawing Sheets

SYSTEM, DEVICE, METHOD AND PROGRAM THAT PREDICT COMMUNICATION QUALITY

CROSS-REFERENCE TO RELATED APPLICATIONS

This application is a 371 U.S. National Phase of International Application No. PCT/JP2020/007361, filed on Feb. 25, 2020. The entire disclosure of the above application is incorporated herein by reference.

TECHNICAL FIELD

The present disclosure relates to prediction of the quality of wireless communication with a plurality of frequency channels using environment information.

BACKGROUND ART

The Internet of things (IoT) in which various devices are connected to the Internet has increasingly been realized, and various devices such as cars, drones, and construction machine vehicles have been connected in a wireless manner. As wireless communication standards, supporting wireless standards such as wireless local area network (LAN) defined by the standardization standard IEEE 802.11, Bluetooth (trade name), cellular communication by LTE or 5G, low power wide area (LPWA) communication for IoT, electronic toll collection system (ETC) used for car communication, vehicle information and communication system (VICS (trade name)), and ARIB-STD-T109 have also been developed and are expected to become widespread in the future.

However, while wireless communication is used for various applications, there is a problem that, depending on the services, wireless communication may not always be able to meet requirements for communication quality. Particularly, it has not been unavoidable that the movement of communication apparatuses changes the directivity of antennas and propagation environments, which affects the communication quality. In NPL 1, information on a distance between a robot and a base station is used to predict communication quality. In a wireless communication system that enables wide-range communication, such as a wireless LAN or LTE/5G, wireless communication between base stations and terminals is performed by selecting specific frequencies from among a plurality of frequency channels, and further, a plurality of options are present for frequency bandwidths as well. In order to generate a communication prediction model for all combinations of frequency channels, it is necessary to perform learning for all the combinations with a sufficient amount of data, and thus a load increases.

CITATION LIST

Non Patent Literature

NPL 1: C. J. Lowrance, A. P. Lauf, "An active and incremental learning framework for the online prediction of link quality in robot networks," Engineering Applications of Artificial Intelligence, 77, pp. 197 to 211, 2018.

SUMMARY OF THE INVENTION

Technical Problem

Thus, the present disclosure has been made in view of the above, and an object thereof is to enable prediction of communication quality in a manner compatible with wireless communication under frequency conditions as combinations of frequencies and frequency bandwidths.

Means for Solving the Problem

In order to achieve the aforementioned object, a communication apparatus according to the present disclosure learns and models relationships with communication quality in accordance with utilization conditions of frequency channels, with environment information including at least one of a position/an orientation/a speed/a configuration operation/control information of the communication apparatus or a communication counterpart and camera information/sensor information collected by the communication apparatus, the communication counterpart, or a device connected via a network to which the communication apparatus and the communication counterpart are connected, and the communication apparatus selects and processes the models in accordance with frequency channels actually used for communication or frequency channel conditions that may be used for communication to predict communication quality.

A system according to the present disclosure includes: an environment information generation unit configured to generate environment information that includes at least one piece of information from a position, a posture, a motion, a control command, a camera, and sensor information of a terminal that performs wireless communication; a communication prediction model storage unit configured to store a plurality of communication prediction models obtained by learning relationships between the environment information and communication quality of wireless communication under frequency channel conditions corresponding to frequencies, frequency bandwidths, or both of the frequencies and the frequency bandwidths of the wireless communication; a communication prediction model generation unit configured to select one or more communication prediction models to be used to predict communication quality of the terminal from among the plurality of communication prediction models stored in the communication prediction model storage unit and generate a communication prediction model corresponding to a frequency channel condition for the wireless communication used by the terminal, with the one or more communication prediction models selected; and a communication prediction unit configured to input the environment information generated by the environment information generation unit to the communication prediction model generated by the communication prediction model generation unit and predict current or future communication quality of the terminal.

Here, each configuration included in the system according to the present disclosure may be included in the same apparatus or different apparatuses. In other words, the system according to the present disclosure includes apparatuses including the environment information generation unit, the communication prediction model storage unit, the communication prediction model generation unit, and the communication prediction unit.

A method according to the present disclosure includes: by an environment information generation unit, generating environment information including at least one piece of information from among a position, a posture, a motion, a control command, a camera, and sensor information of a terminal that performs wireless communication; by a communication prediction model generation unit, referring to a plurality of communication prediction models obtained by learning relationships between the environment information and communication quality of wireless communication under frequency channel conditions corresponding to frequencies, frequency bandwidths, or both frequencies and frequency bandwidths of the wireless communication, selecting one or more communication prediction models to be used to predict communication quality of the terminal from among the plurality of communication prediction models, and using the selected communication prediction models to generate a communication prediction model corresponding to a frequency channel condition of the wireless communication used by the terminal; and by a communication prediction unit, inputting the environment information generated by the environment information generation unit to the communication prediction model generated by the communication prediction model generation unit and predicting current or future communication quality of the terminal.

An apparatus according to the present disclosure includes: a communication prediction model learning unit configured to acquire environment information including at least one kind of information from among a position, a posture, a motion, a control command, a camera, and sensor information of a terminal that performs wireless communication, learn relationships between the environment information and communication quality of wireless communication under frequency channel conditions corresponding to frequencies, frequency bandwidths, or both frequencies and frequency bandwidths of the wireless communication, and generate a communication prediction model.

A program according to the present disclosure causes a computer to function as each functional unit included in the apparatus according to the present disclosure. Also, the program causes the computer to execute each step included in the method according to the present disclosure.

Effects of the Invention

According to the present disclosure, prediction becomes possible using an appropriate communication prediction model in accordance with wireless communication under various combinations of frequency conditions to perform communication prediction with high accuracy.

DESCRIPTION OF EMBODIMENTS

Embodiments of the present invention will be described with reference to the accompanying drawings. The embodiments described below are examples of the present invention and the present invention is not limited to the embodiments described below. Note that constituent elements with the same reference signs in the specification and the drawings are assumed to be the same constituent elements.

Figure 1:
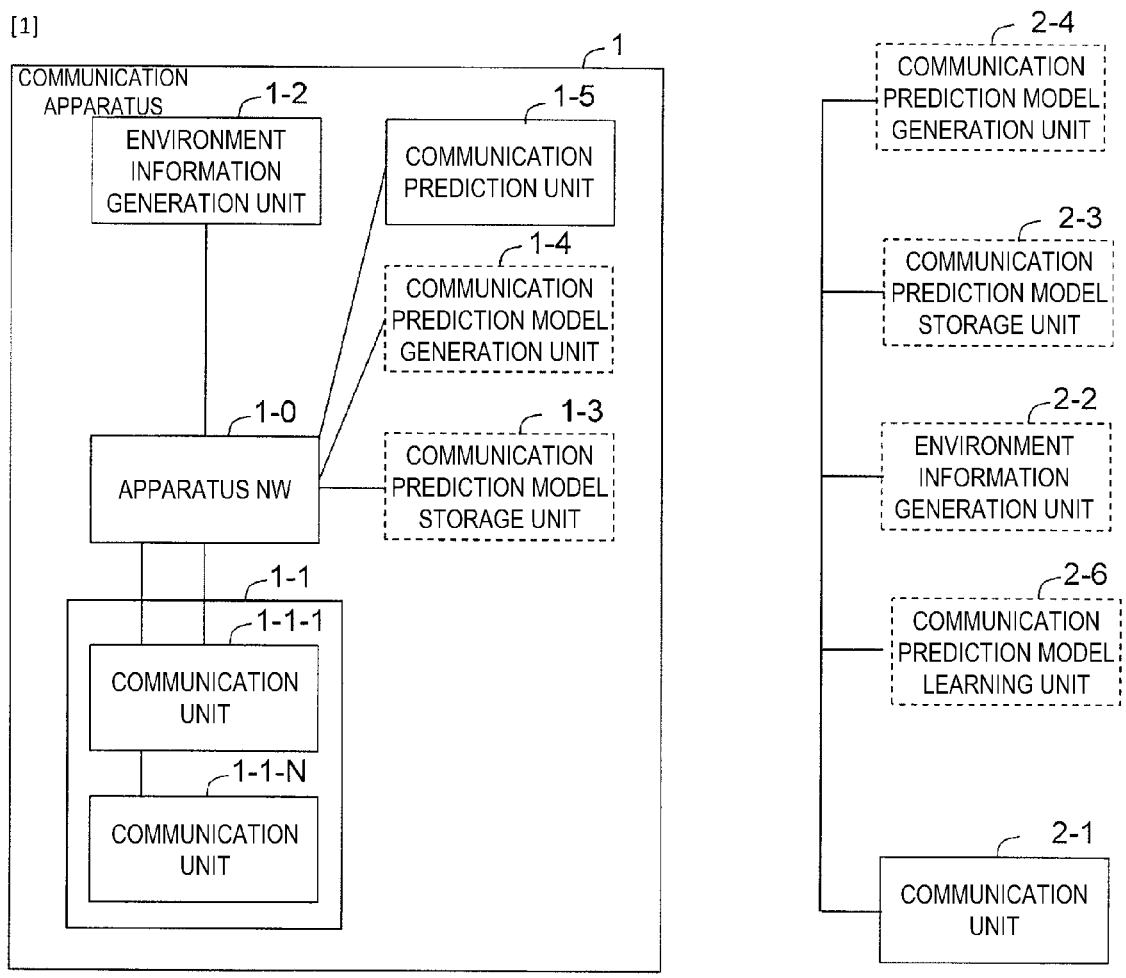
FIG. 1 is an example of functional units included in a system according to the present disclosure.

FIG. 1 is a configuration diagram for explaining a communication apparatus 1 according to the present embodiment. The communication apparatus 1 includes a communication unit 1-1 that performs wireless communication using a plurality of frequency channels. The communication unit 1-1 includes communication units 1-1-1 to 1-1-N. The communication units 1-1-1 to 1-1-N are communication units that can be connected to outside in a wireless or wired manner, and at least one of them corresponds to a wireless communication system.

The communication apparatus 1 includes:
an environment information generation unit 1-2 configured to generate environment information including at least one or more pieces of information from positions, postures, motions, and control commands of the communication apparatus 1 itself, a communication counterpart, or both of the communication apparatus 1 and the communication counterpart and camera and sensor information collected by a camera and a sensor connected via any of the communication units 1-1-1 to 1-1-N;
a communication prediction model storage unit 1-3 configured to store relationships between the environment information and communication quality;
a communication prediction model generation unit 1-4 configured to generate, by using the stored communication prediction models, a communication prediction model to be used by the communication prediction unit 1-5 in accordance with frequency utilization conditions of the communication units 1-1-1 to 1-1-N; and
a communication prediction unit 1-5 configured to construct, from the generated communication prediction model, a communication prediction model suitable for a method of using frequencies that the communication units 1-1-1 to 1-1-N have already used, that the communication units 1-1-1 to 1-1-N will use from now, or that the communication units 1-1-1 to 1-1-N may use, and to predict communication quality of the communication units 1-1-1 to 1-1-N by using input environment information or the like.

The communication prediction model storage unit 1-3 does not need to be included in the communication apparatus 1, and a communication prediction model storage unit 2-3 that is present in a network connected via any of the communication units 1-1-1 to 1-1-N may be used The communication prediction model storage unit 1-3 can acquire communication quality information from a communication unit 2-1 or the communication units 1-1-1 to 1-1-N, learn relationships with respect to the environment information, and store the relationships for frequency conditions.

Here, the communication quality is a received signal power, a signal to noise power ratio, a signal to interference noise power ratio, a received signal strength indication (RSSI), received signal reference quality (RSRQ), a packet error rate, the number of arriving bits, the number of arrival bits per unit time, a modular code index, the number of retransmissions, a delay time, derivative information of values thereof, and an index calculated from these values using a calculation equation. The communication prediction model storage unit 1-3 calculates and stores relationships between one or more pieces of the communication quality information obtained here and the environment information in accordance with the frequency conditions.

The communication apparatus 1 does not have a function of generating communication prediction models and can store only results of learning the relationships with the communication quality in advance in the communication prediction model storage unit 1-3. For example, a communication prediction model learning unit 2-6 performs learning and generates a communication prediction model. The communication prediction model learning unit 2-6 can generate the communication prediction model from a relationship between the environment information and the communication quality actually acquired or may generate the communication prediction model from a relationship in a virtual environment through calculator simulation. An apparatus including the communication prediction model learning unit 2-6 provides the communication prediction model to the communication apparatus 1 using the communication unit 2-1. The communication apparatus 1 acquires the communication prediction model using the communication unit 1-1 and stores the communication prediction model in the communication prediction model storage unit 1-3.

Also, the environment information used by the communication prediction unit 1-5 or the communication prediction model is not limited to the information of the environment information generation unit 1-2 in the communication apparatus 1, and an environment information generation unit 2-2 that is present in a network connected via any of the communication units 1-1-1 to 1-1-N or the environment information generation units 1-2 and 2-2 can be used. Moreover, a plurality of environment information generation units 2-2 may be present. The communication unit 2-1 has a communication function of connecting any of the communication units 1-1-1 to 1-1-N in a wired or wireless manner.

Figure 2:
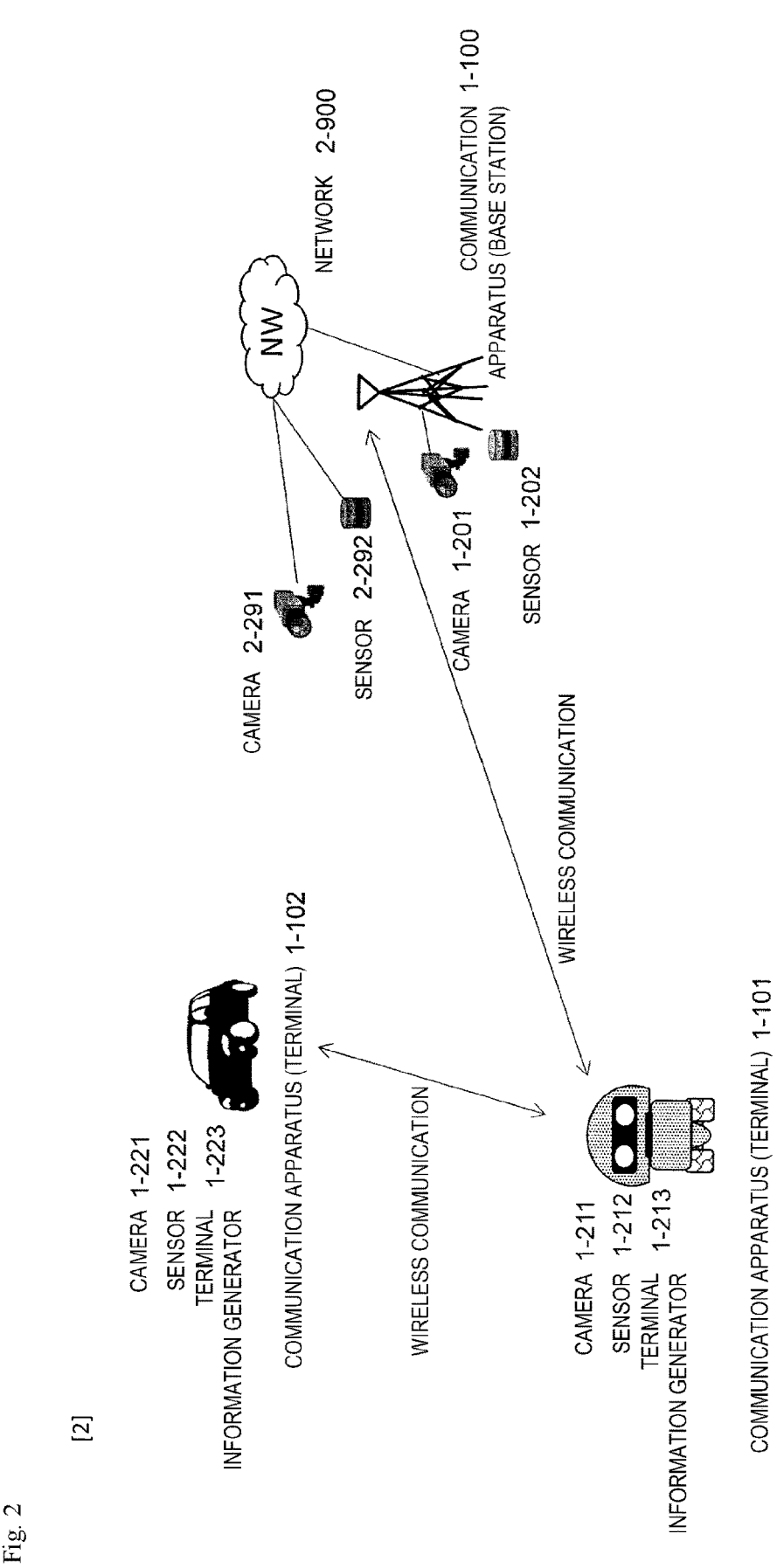
FIG. 2 is an example of a system configuration according to the present disclosure.

The communication apparatus 1 is a communication apparatus having at least a wireless communication function, and can be moved by itself, or may be spatially fixed as a base station. A conceptual diagram of the configuration is illustrated in FIG. 2. Here, three examples including communication apparatuses 1-100, 1-101, and 1-102 are described as the communication apparatus 1. The communication apparatus 1-100 is a fixed base station, the communication apparatus 1-101 is a mobile terminal that communicates with a fixed base station, and the communication apparatus 1-102 is a mobile terminal that communicates with a moving communication apparatus.

Examples of the environment information collecting unit 1-2 or 2-2 includes a camera 1-201 and a sensor 1-202 connected to the communication apparatus 1-100, an external camera 2-291 and a sensor 2-292 connected to a network 2-900, a camera 1-211, a sensor 1-212, and a terminal information generator 1-213 connected to the communication apparatus 1-101, and a camera 1-221, a sensor 1-222, and a terminal information generator 1-223 connected to the communication apparatus 1-102. The terminal information generators 1-213 and 1-223 are devices that generate terminal information including at least one of positions/orientations/speeds/configuration operations/control information/odometry information of the communication apparatuses 1-101 and 1-102. The terminal information generators 1-213 and 1-223 may generate terminal state information using information from the sensors and the cameras.

The communication apparatus according to the present disclosure can be used as any of the communication apparatuses 1-100, 1-101, and 1-102, and information from any of the cameras/sensors/terminal information generators can be used as environment information. In the communication apparatus 1 or the network 2-900, a communication prediction unit in which communication quality is predicted is realized by modeling relationships between the communication quality of wireless communication among communication apparatuses and environment information through machine learning and newly inputting environment information or environment information and past communication quality information. At this time, the communication prediction model is generated based on frequency utilization conditions.

Figure 3:
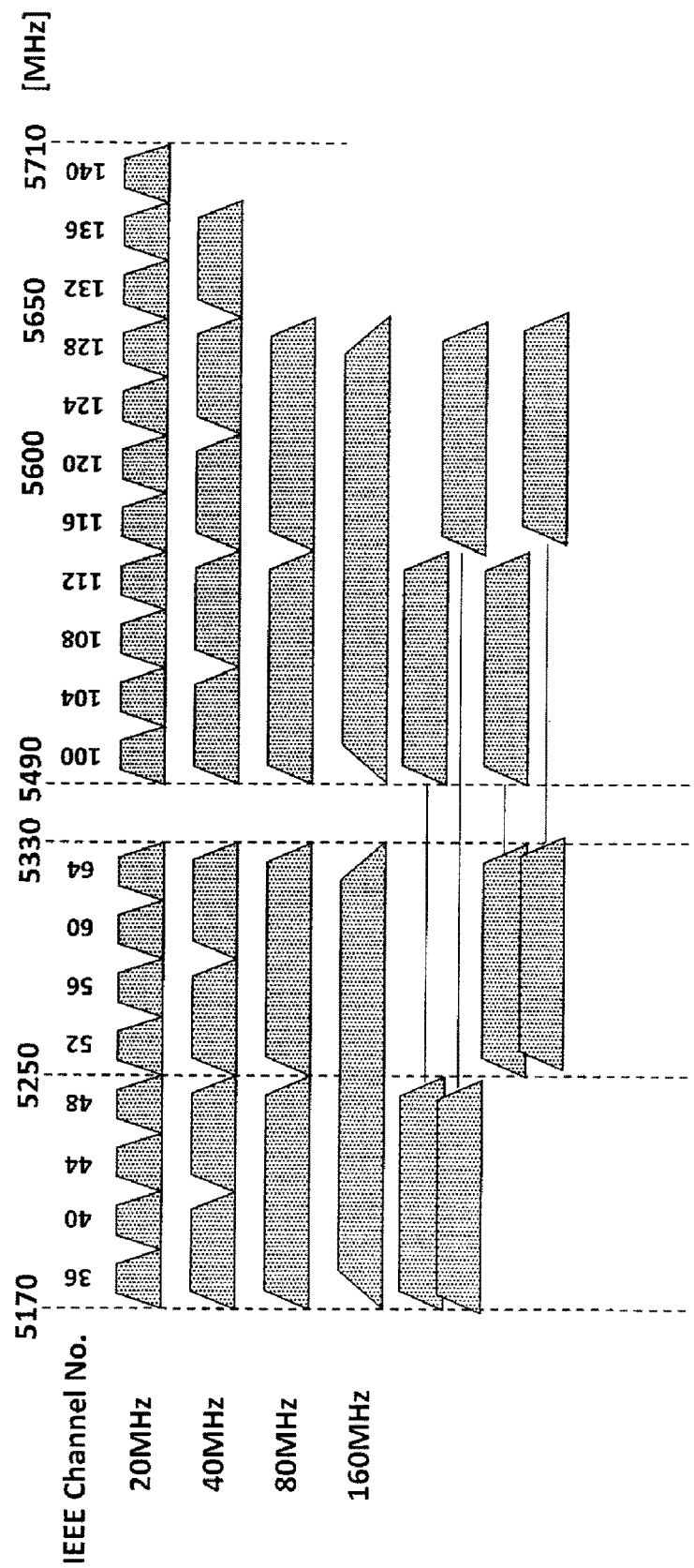
FIG. 3 illustrates an example of distribution of wireless channels around 5 GHz.
Figure 4:
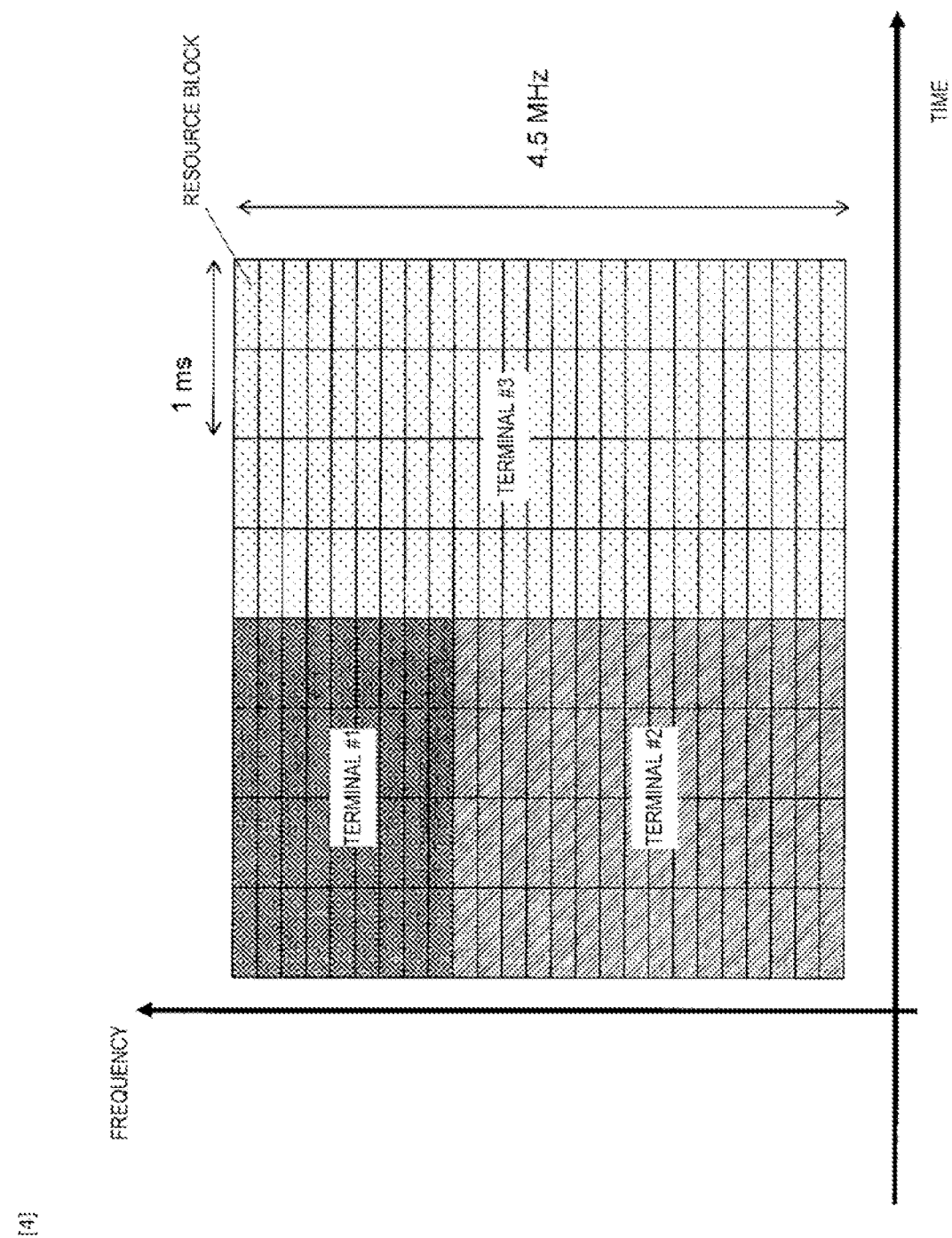
FIG. 4 illustrates an outline of a method of using frequencies in a case of LTE.

FIGS. 3 and 4 illustrate an outline of a method of using frequencies in a wireless LAN and LTE. FIG. 3 illustrates, as an example, distribution of wireless channels (5.17 to 5.71 GHz) around 5 GHz. As illustrated in the drawing, a frequency bandwidth of 20 to 160 MHz and a position thereof in the drawing can be used in the wireless LAN IEEE 802.11. Trapezoids in the drawing represent frequency channels. So that a plurality of independent communication apparatuses can be present together, the frequency positions and the frequency bandwidths can be used only in the combinations described here. Although each of 36 and 40 represented by IEEE channel numbers can be used in a frequency bandwidth of 20 MHz, 36 and 40 correspond to the same frequency channel in the frequency bandwidth of 40 MHz. A basic frequency channel is designated by an IEEE channel number, and a frequency bandwidth in which transmission is to be performed is selected based on an actual transmission environment.

There is a probability that the communication quality will be different if frequencies and bandwidths are different. Thus, forming a communication prediction model for each trapezoid in FIG. 3 is ideal when the aforementioned communication prediction model is formed. However, the number of only the trapezoids illustrated in FIG. 3 is thirty-eight, and collection of sufficient data to form the communication prediction model incurs a large load.

FIG. 4 illustrates an outline of a method of using frequencies in a case of LTE. In LTE, downlink or uplink communication is performed with resource blocks (RBs) represented by specific frequencies and times as designated by a base station from among frequency conditions allowed for the communication apparatus. Here, an example in which there is a band of 4.5 MHz and 25 RBs are present in a frequency direction is illustrated. Each square in the drawing represents 1 RB, and in a case in which allocation is performed, 2 RBs are combined as a set in a time direction, and allocation can be performed for every 1 ms. In FIG. 4, an example in which the base station performs downlink communication from a terminal #1 to a terminal #3 is illustrated. 9 RBs are allocated to the terminal #1, and 16 RBs are allocated to the terminal #2 for the first 2 ms, and downlink communication to the terminal #3 is performed in the remaining 2 ms. The base station can allocate any selected RBs to communication with the terminals.

Thus, according to the present disclosure, a communication prediction model is formed along with information related to the allocation of RBs in order to strictly predict the communication quality as described above. Specifically, a communication prediction model may be formed for the allocation of the RBs, all the channels may be split into several groups, and a communication prediction model may be formed based on which group has been used, or a common communication prediction model may be formed for all the channels, and then a communication prediction model tuned for the allocation of the RBs may be newly formed from an output of the common communication prediction model in accordance with a method of allocating the RBs. Bandwidths may also be split into several groups, or a threshold value may be used for determination, such as whether the bandwidths are 10 RB or more or less, for example.

Figure 5:
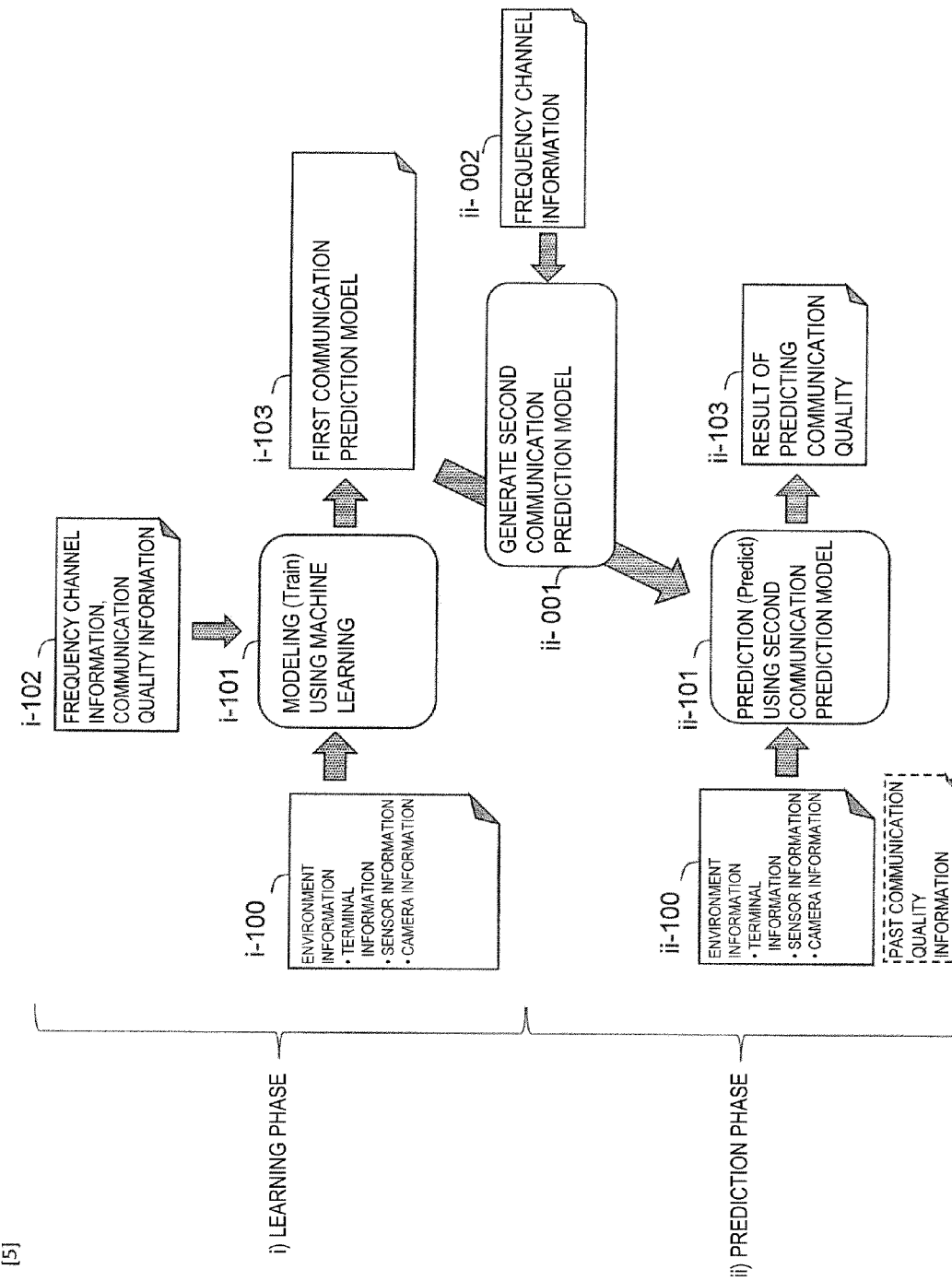
FIG. 5 illustrates an outline of communication prediction performed by a communication apparatus 1.

FIG. 5 illustrates an outline of prediction of communication quality performed by the communication apparatus 1. In order to enable the prediction of communication quality, a learning phase through machine learning (i) and a prediction phase (ii) are needed. The environment information generation unit 1-2 or 2-2 generates environment information including at least a part of terminal information of the communication apparatus 1 or the communication counterpart, which performs wireless communication, or both the communication apparatus 1 and the communication counterpart, camera information, and sensor information (i-100). Examples of the camera information and the sensor information include visual information for each pixel of a movie, depth information obtained by a depth camera, point group data of light detection and ranging (LIDAR), and object information regarding the position, the size, and the material obtained as a result of object recognition based on deep learning from a movie or point group data.

In the learning phase (i), relationships between communication quality information and environment information are modeled through machine learning and are stored as first communication prediction models in accordance with conditions of frequencies used by the terminals. Here, as the method for learning the first communication prediction models, the following two methods can be employed.

According to a method for learning the first communication prediction model, a first communication prediction model is generated for each frequency channel condition used by the terminals. At this time, the frequency channel conditions may be all possible combinations, or a specific number M of frequency channel conditions may be generated for each frequency interval or for each bandwidth.

A method for learning the second communication prediction model is generated by splitting the first communication prediction model into two models, a first former part communication prediction model corresponding to the former part and a first latter part communication prediction model corresponding to the latter part, and learning the first former part communication prediction model and the first latter part communication prediction model using mutually different learning conditions. The first former part communication prediction model has a complicated structure, and the first latter part communication prediction model has a simple structure, and as a result, the first latter part communication prediction model can be easily leaned and formed so as to correspond to detailed conditions. Here, the complicated structure corresponds to a large amount of features to be input, the number of ANN neurons, the number of ANN layers, the number of decision trees, the number of determinations, and the depth of the determination trees. As the structure becomes complicated, a large amount of data is typically needed for learning models.

The first former part communication prediction model can be commonly used for wide range conditions of frequency channels for communication, and the first latter part communication prediction model corresponds to detailed frequency channel utilization conditions. Because the first former part communication prediction model can correspond to a wide range of frequency channel conditions, the models can be optimized by learning data with many conditions. Because the second latter part communication prediction model is a model with a low complexity, it is possible to perform learning with a smaller amount of data and to correspond to detailed frequency channel utilization conditions. The combination of the first former part communication prediction model and the first latter part communication prediction model can be determined in accordance with conditions of a frequency channel, and it is possible to obtain a result of predicting communication quality under a certain frequency channel condition from the combination of one or more former part communication prediction models and one or more latter part communication prediction models.

According to the learning conditions, for the former part communication prediction model, it is possible to set a learning rate low, to set the learning rate lower as a distance from the layer near an output increases, to set some or all of weights, biases, and determined values of decision trees not to be updated, or to set a regulation coefficient. For the first latter part communication prediction model, a higher learning rate, a smaller regulation coefficient, and a wider range of change in coefficient update can be set as compared with the former part communication prediction model. However, in a case in which the first latter part communication prediction unit is used as a simple linear processing unit such as for summing or weighting summing of the first former part communication prediction model as described below, it is also possible to apply a calculation rule defined in advance without performing learning.

In all cases, a relationship between information regarding frequency channels available for terminals, communication quality information (i-102), and environment information (i-100) is modeled using machine learning (i-101). Hereinafter, the first communication prediction model is assumed to include the first former part communication prediction model and the first latter part communication prediction model. This modeling can be achieved by transfer learning using a similar model that can be acquired in advance and can be continuously updated through on-line learning by successively inputting i-100 and i-102. The obtained communication prediction model is stored in the communication apparatus 1 or the communication prediction model storage unit 1-3 at any position connected via a network (i-103).

A relationship between terminal information and the communication quality information is modeled through machine learning performed by the communication prediction model learning unit 2-6 included in the communication apparatus 1 or installed outside the communicable communication apparatus 1. Alternatively, the communication apparatus 1 may acquire the first communication prediction model generated in advance from the communication prediction model storage unit 2-3 and then store the acquired first communication prediction model. As an algorithm for the machine learning, a machine learning algorithm such as a support vector machine, a multilayer perceptron, a k-nearest neighbor method, or a random forest, an artificial neural network (ANN) including deep learning, and a bagging method that combines these.

Next, the prediction phase (ii) is performed. A condition of a frequency channel used in the prediction phase is newly generated (ii-002). The communication prediction model generation unit generates the second communication prediction model based on frequency channel information. As generation methods used at this time, there are three methods (ii-001).

According to the first generation method, the first communication prediction model is selected from among first communication prediction models generated in advance based on conditions of a frequency channel for which communication quality is desired to be predicted, and the selected first communication prediction model is used as the second communication prediction model. In a case in which a first communication prediction model that can supports all frequency conditions is not available, a communication prediction model with the closest conditions of a frequency position and a frequency bandwidth is selected from the communication prediction models generated in advance. In this case, a method for determining the closest conditions is defined in advance. Rules are defined such that, for example, a model with the smallest deviation in a center position of a frequency domain to be used is prioritized, when models have the same frequency distance and different bandwidths, models with the same bandwidth are selected among them, models with a larger frequency bandwidth and with smaller deviation of bandwidth is selected if there are no models with the same frequency width, and a model with a smaller frequency bandwidth and with smaller bandwidth deviation is selected if there is no corresponding model. In a case in which frequency channels with different bandwidths are selected, a correction filter for a result of the prediction described below can be used together.

The second and third generation methods correspond to the second model learning method.

According to the second generation method, communication quality is predicted using a machine learning model defined as the first latter part communication prediction model by selecting a plurality of first former part communication prediction models from among the first former part communication prediction models generated in advance and by averaging outputs or summing with weighting defined as the first latter part communication prediction model. A method for selecting the first former part communication prediction models includes selecting two models with the closest frequencies and selecting models that are present in a wide frequency band to be used and have a plurality of frequency channels with a narrower frequency bandwidth than the frequency band. The second latter part communication prediction model is not necessarily trained with sufficient data, and arithmetic expressions may be stored in advance in accordance with frequency conditions, such as averaging processing or defining weighting corresponding to how close the frequencies are.

According to the third generation method, one first former part communication prediction model and one first latter part communication prediction model are selected and defined as the second communication prediction models.

In the prediction phase, environment information is generated similarly to the learning phase (ii-100). In a case in which past communication quality information is available at this time, it is also possible to input the past communication quality information as environment information (the dashed line block below ii-100 in the drawing). The communication prediction unit 1-5 uses input ii-100 and predicts communication quality through machine learning (ii-102) from the second communication prediction model (ii-001) for the generated frequency channel information.

Also, the communication prediction unit may determine whether a specific event related to communication quality occurs instead of outputting specific indexes. For example, it is possible to detect a specific condition that adversely affects user's feeling. When the indexes of the communication quality defined in advance satisfy conditions defined in advance, it is considerable that a specific event related to the communication quality has occurred. Here, the aforementioned index is the number of bits per time, the number bits per time and frequency, a packet loss, a packet loss rate, RSSI degradation, RSRQ degradation, a packet transmission rate, the amount of change in these parameters from normal time, and the amount of features extracted from these plurality of parameters. Also, such an event may be defined as an event categorized as degradation of communication quality due to a change in environment information, and machine learning may be used as a classification algorithm for classifying the event or as a regression algorithm for predicting a numerical value representing communication quality.

Figure 6:
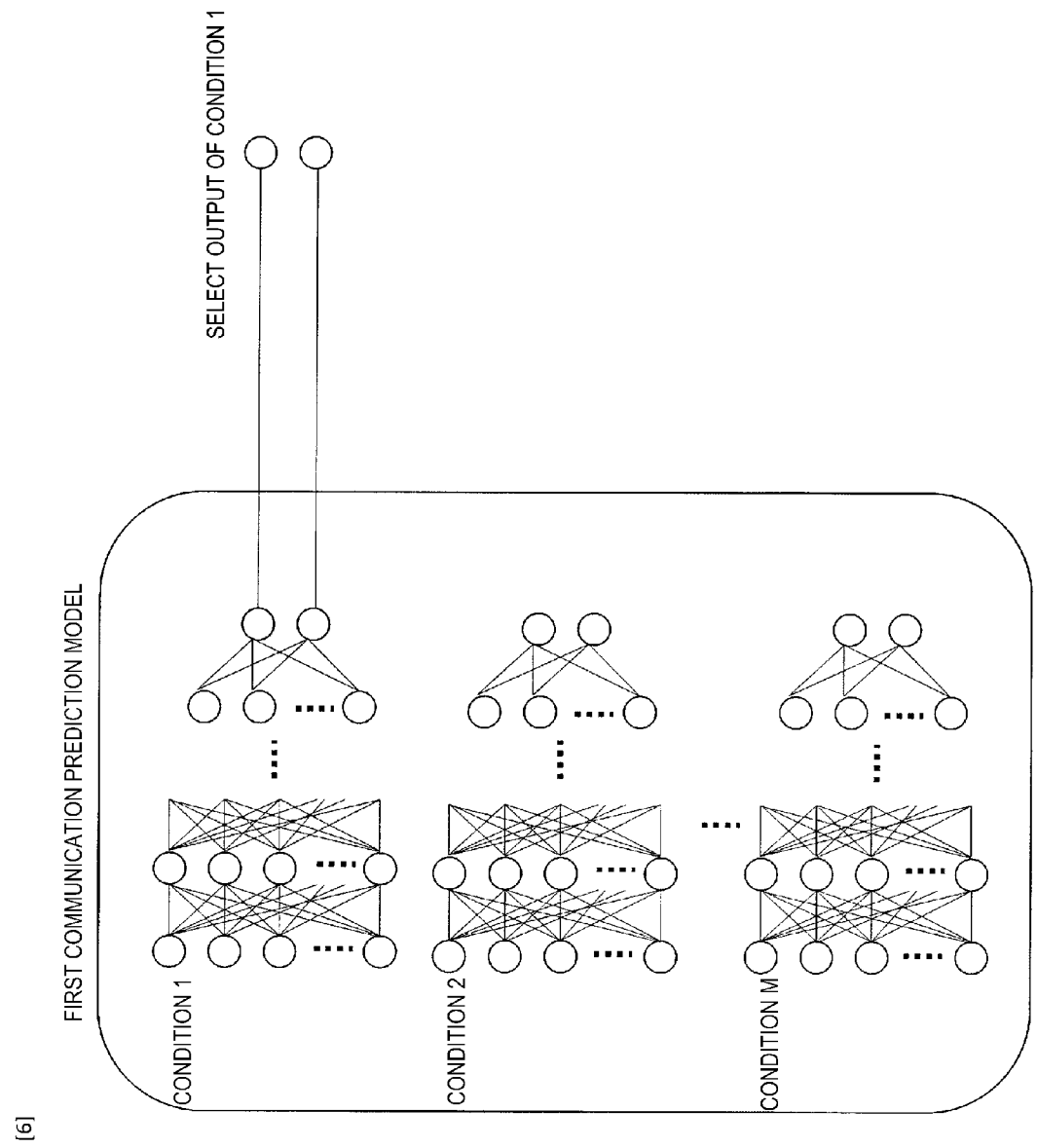
FIG. 6 illustrates a first example of a process for generating a second communication prediction model from a first communication prediction model.

FIGS. 6 to 9 illustrate how the second communication prediction model that is actually used is generated from the first communication prediction model. In FIG. 6, one of the first communication prediction models stored in the communication prediction model storage unit is selected to predict communication quality. The communication prediction model storage unit stores a communication prediction model to output communication quality information using M (M is an integer that is equal to or greater than one) pieces of environment information as input information in accordance with frequency conditions. The communication prediction model generation unit selects the first communication prediction models from the communication prediction model storage unit using prior information such as models with close frequencies, channels that are known to be highly relevant in advance, models with the latest timing when a communication prediction model was generated, and models with a large amount of data used to train communication prediction models. As illustrated in the drawing, a plurality of items of communication quality may be output, or one item may be output.

Figure 7:
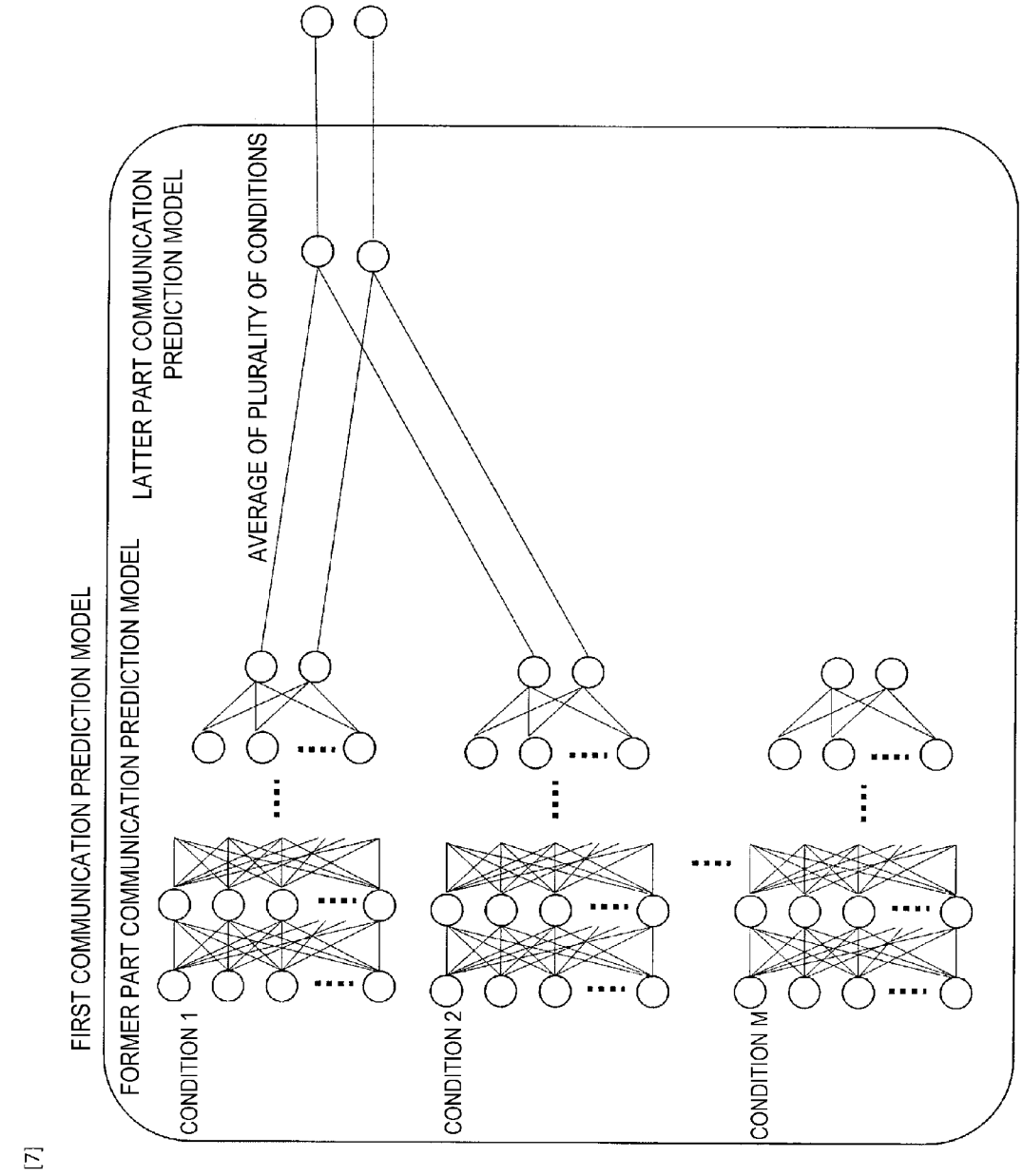
FIG. 7 illustrates a second example of the process for generating the second communication prediction model from the first communication prediction model.

In FIG. 7, the communication prediction model generation unit averages a result of outputting a plurality of communication prediction models from the communication prediction model storage unit. The selection way includes selecting models with a close frequency distance, selecting a model with a large amount of data used for learning, selecting a model with data used for learning at the latest time, selecting a model by a calculation expression defined in advance based on a frequency relationship and learning information, or weighting and adding. In a case in which the weight of addition is optimized through learning, averaging processing of the latter part can be regarded as the first latter part communication prediction model as illustrated in FIG. 7. In this case, measurement data under the frequency channel conditions is used to lean the weight by which outputs of the first former part communication prediction model are multiplied, and the addition way can be optimized for the frequency channel conditions.

Figure 8:
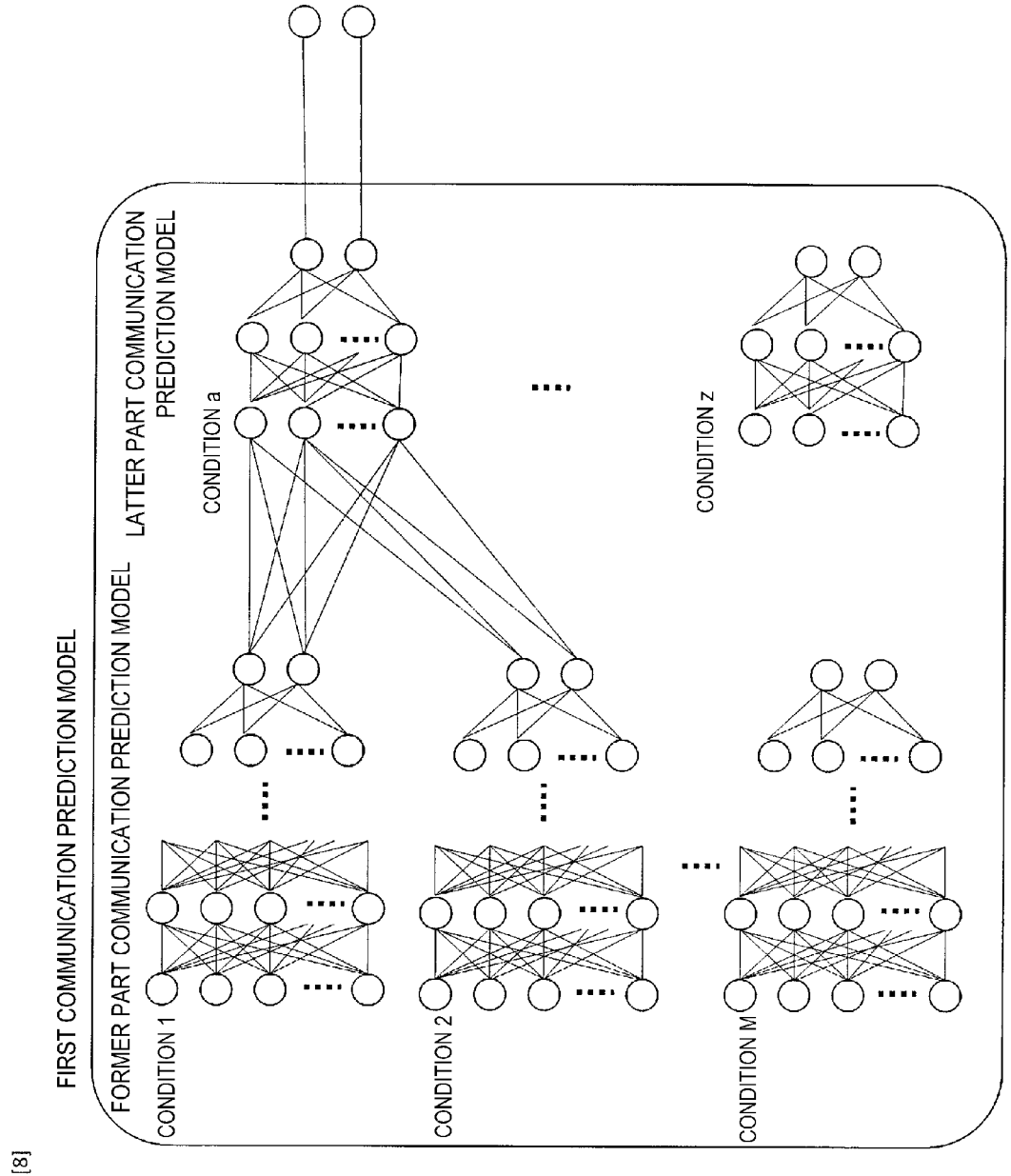
FIG. 8 illustrates a third example of the process for generating the second communication prediction model from the first communication prediction model.

FIG. 8 illustrates a configuration in which a result of outputting a plurality of first former part communication prediction models are input to the first latter part communication prediction model and an obtained output is used as a result of predicting communication quality. Which former part communication prediction models and which latter part communication prediction models are used for a certain frequency channel condition are set in advance, and the communication prediction model learning unit trains the communication prediction model using the set combination. The former part communication prediction model and the latter part communication prediction model selected for the certain frequency channel condition can be determined by the frequency channel condition.

For example, for a frequency channel condition by a wireless LAN, and in a case in which it is desired to predict communication quality of a wide range channel such as 40 MHz or 80 MHz, a plurality of first former part communication prediction models trained for a narrower frequency bandwidth channel (20 MHz or 40 MHz) included in the channel are selected, and a communication prediction model unique to the frequency channel of 40 MHz or 80 MHz can be used as the latter part communication prediction model. In a case in which it is similarly desired to perform communication using a wideband RBs in LTE, a plurality of first communication prediction models trained in RBs in smaller units included in the RBs is selected to use a first latter part communication prediction model unique to an RB condition under which communication is actually performed from now, as the latter part communication prediction model. Alternatively, in wireless LAN and LTE, it is possible to train first former part communication prediction models common to frequency channels of a unit frequency bandwidth in a specific frequency range, select a plurality of first former part communication prediction models close to the frequency to be predicted, and use a model learned as a communication model unique to the frequency channel as the first latter part communication prediction model. Also, the first latter part communication prediction model may not be unique to the frequency channel and may correspond to more detailed frequency channel conditions than the first former part communication prediction models and used commonly by a plurality of frequency channels.

The first latter part communication prediction model can be constructed with a small amount of data by setting the first latter part communication prediction model as a communication prediction model with a lower learning load than the first former part communication prediction models included in the communication prediction model storage unit. The low learning load means, for example, in a decision tree, the number of features to be input is small and a depth of the decision tree is reduced, and in a random forest, the number of features to be input is small and the depth of the decision tree is reduced, and the number of trees to be used is reduced. The low learning load corresponds to the fact that it is possible to set the small number of features to be input, the small number of layers, and the small number of nodes constituting each layer in a neural network. The learning load can be reduced by using machine learning in which an algorithm itself is simple, such as linear regression, as the first latter part communication prediction model.

Figure 9:
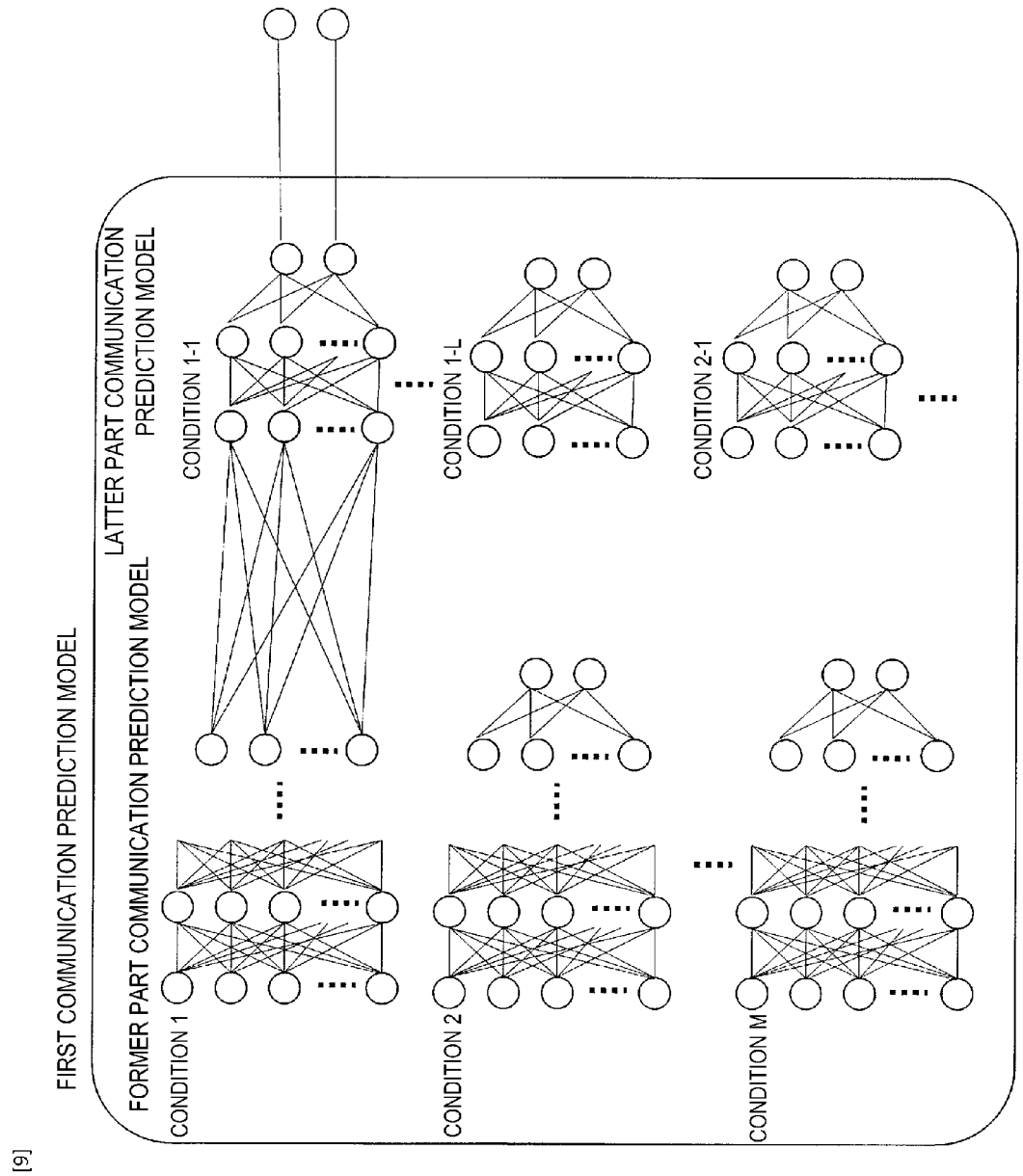
FIG. 9 illustrates a fourth example of the process for generating the second communication prediction model from the first communication prediction model.

FIG. 9 illustrates a configuration in which a result of outputting one first former part communication prediction model is input to a first latter part communication prediction model and an obtained output is used as a result of predicting communication quality. Which former part communication prediction models and which latter part communication prediction models are sed for a certain frequency channel condition are set in advance, and the communication prediction model learning unit trains the communication prediction model using the set combination. The frequency channel conditions that supported by the first former part communication prediction model can be set in a wide range, and the frequency channel conditions supported by the first latter part communication prediction model can be set in a more detailed range or can be set independently by individual frequency channels.

As in FIG. 8, the first latter part communication prediction model can be built from a small amount of data by lowering the learning load compared to the first former part communication prediction model included in the communication prediction model storage unit. The low learning load means, for example, in a decision tree, the number of features to be input is small and a depth of the decision tree is reduced, and in a random forest, the number of features to be input is small and the depth of the decision tree is reduced, and the number of trees to be used is reduced. The low learning load similarly corresponds to the fact that it is possible to set the small number of features to be input the small number of layers, and the small number of nodes constituting each layer in a neural network. The learning load can be reduced by using machine learning in which an algorithm itself is simple, such as linear regression, as the first latter part communication prediction model.

Although FIGS. 6 to 9 describe that the ANN has a specific configuration for explanation, it is possible to use any of the aforementioned machine learning algorithms instead.

Figure 10:
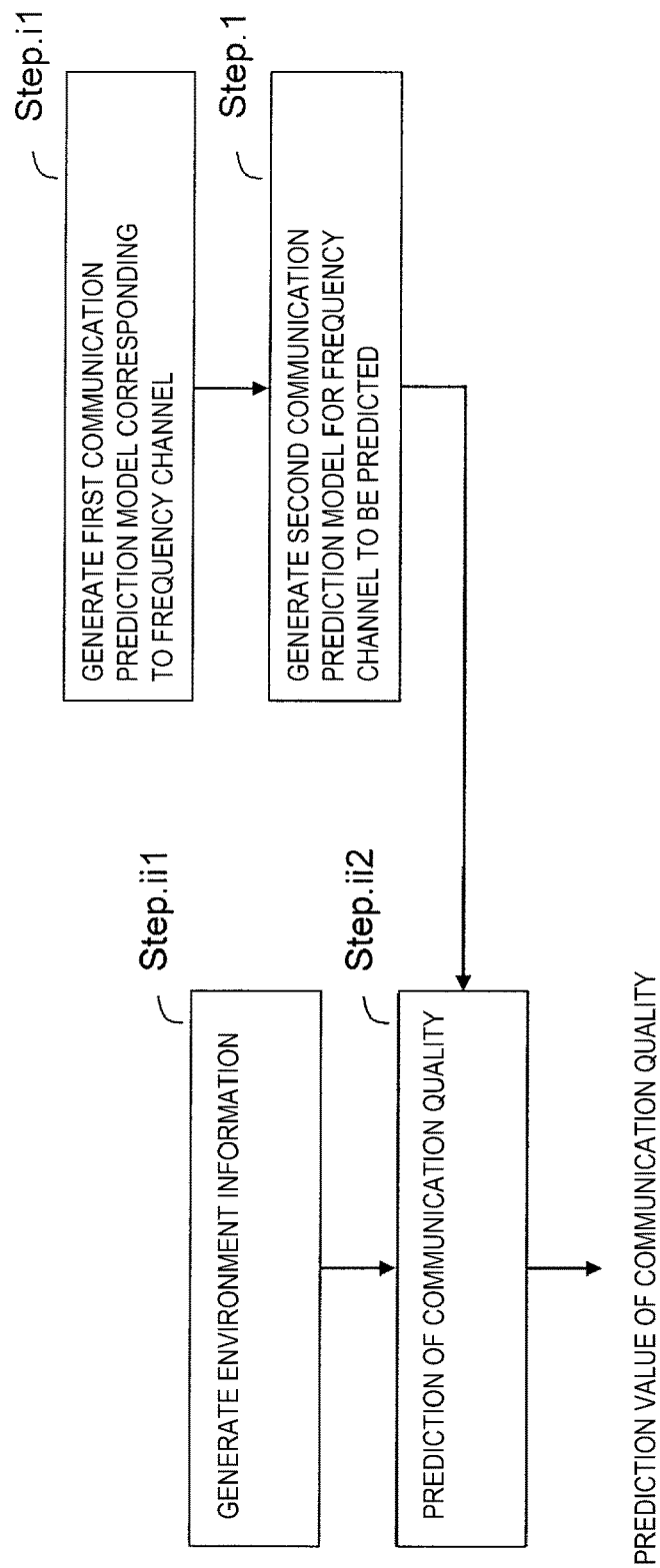
FIG. 10 illustrates a flow diagram illustrating a first method according to the present disclosure.
Figure 11:
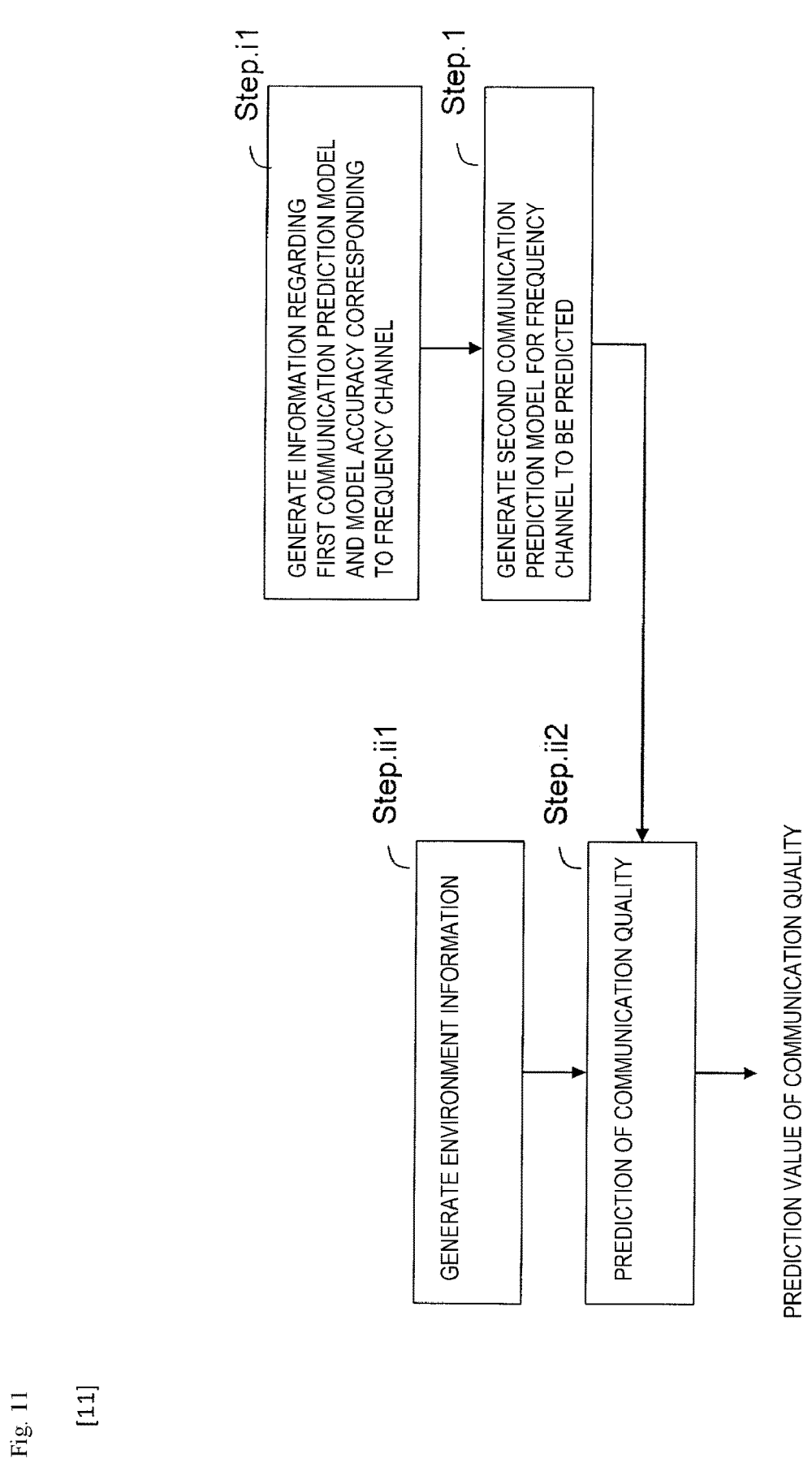
FIG. 11 illustrates a flow diagram illustrating a second method according to the present disclosure.

FIGS. 10 and 11 illustrate a flow diagram illustrating a method according to the present disclosure. The flow diagram in FIG. 10 will be described. In the present disclosure, first communication prediction models corresponding to frequency conditions are generated first through machine learning and are then stored in the communication prediction model storage unit (Step i1). In a case in which the communication apparatus 1 performs communication and desires to predict communication quality corresponding to a certain frequency condition, a first communication prediction model stored in the communication prediction model storage unit in association with the frequency condition is used to generate and extract a second communication prediction model (Step 1). Environment information that can be collected at the same time is generated (Step iii). Then, the communication prediction model generated in Step 1 is used to predict communication quality corresponding to the frequency channel and the environment information (Step ii2). Here, past communication quality information may be used as the environment information in Step ii1. Moreover, the aforementioned three generation methods can be used to generate the communication prediction model, and it is possible to select the same communication prediction model as that for the frequency condition, to select a communication prediction model with a close frequency, or to generate a new communication prediction model from a plurality of communication prediction models.

In the flow in FIG. 11, model accuracy information related to accuracy of the first communication prediction model is also generated when the communication prediction model corresponding to the frequency channel is generated in Step ii (Step i1). The model accuracy information includes, for example, an any combination of the amount of data used for generating the model, an elapsed time after the model is generated or updated, and a variation in models evaluated when the model is generated. In an actual communication system, there is no guarantee that a sufficient amount of data is always obtained, and a case in which the model has to be constructed using a limited amount of data or data for a limited frequency can be assumed. Because degradation of model quality due to an unexpected interference is conceivable, it is also possible to separately evaluate accuracy of the generated model. For example, the communication prediction model used by the communication prediction unit is generated by including a converter that converts a frequency deviation into model accuracy, comparing the frequency deviation with model accuracy individually evaluated for each model, and selecting one or more models that are considered to have the highest model accuracy (Step 1). Alternatively, model similarity with respect to a frequency may have characteristic distribution depending on an environment as shown in an experiment example described below, it is also possible to evaluate model accuracy from model similarity between frequencies depending on the utilization environment. Environment information that can be collected at the same time is generated (Step ii1), and the generated communication prediction model is used to predict communication quality corresponding to the frequency channel (Step ii2).

Specifically, specific examples of the flow in a case of a wireless LAN and in a case of LTE will be described. In the wireless LAN, the communication prediction model corresponding to the frequency condition in i-103 in FIG. 5 is generated every channel of 20 MHz because the wireless LAN has a 20 MHz-based channel configuration. Because it is not always possible to generate a communication prediction model after all the channels are trained in a sufficient measurement time, accuracy of the communication prediction models are considered to vary. If the frequency condition to be used from now is determined in ii-002 in FIG. 5, then it is also possible to select a communication prediction model corresponding to the 20 MHz-channel, which is close to the frequency, or to select a plurality of communication prediction models of the 20 MHz channel and to use a result obtained by averaging prediction results. Alternatively, at this time, the communication prediction model may be generated such that a plurality of values from a received signal power, a signal-to-noise power ratio, a signal-to-interference noise power ratio, a received signal strength indication (RSSI), received signal reference quality (RSRQ), a packet error rate, the number of arrival bits, the number of arrival bits per unit time, a modular code index, the number of times of retransmission, a delay time, differential information of these values, and indexes calculated from these values using calculation expressions are output, and a second communication prediction model obtained by learning relationships with communication quality of the frequency condition through machine learning may be used for a plurality of outputs obtained from each of the communication prediction models to predict communication quality from the plurality of communication prediction models and the second communication prediction model using the output result.

Alternatively, in the wireless LAN, the first former part communication prediction model may be prepared for each specific frequency, and the first latter part communication prediction model may be prepared for each more detailed frequency. For example, for performing learning and prediction, groups of eight 20-MHz channels in the wireless LAN are formed, first former part communication prediction models A to E are prepared, such as 5.15 GHz to 5.25 GHz, 5.25 GHz to 5.35 GHz, 5.49 GHz to 5.57 GHz, 5.57 GHz to 5.65 GHz, and 5.65 GHz to 5.73 Ghz, and a first latter part communication prediction model is prepared for each of the 20-MHz channel, the 40-MHz channel, and the 80-MHz channel. Alternatively, outputs of a plurality of first former part communication prediction models in close groups and the first latter part communication prediction model may be used.

Because allocation is performed using resource blocks as described above in LTE, it is possible to generate a communication prediction model for each frequency group, for example, for each 20 RBs (4.5 MHz) and to select models with close frequency conditions of RBs used when communication is actually performed. In a case in which a plurality of frequency groups are targets, a plurality of communication prediction models may be selected, and outputs thereof may be averaged. Also, a communication prediction model of each frequency group outputs a plurality of indexes related to communication quality, and this may be used to generate the second communication prediction model through machine learning. In this case, communication quality may be predicted from the communication prediction models of a plurality of frequency groups and the second communication prediction model.

Alternatively, a first former part communication prediction model may be prepared for each specific frequency, and a first latter part communication prediction model may be prepared for each more detailed frequency, in LTE. In a case of a system with an entire bandwidth of 200 MHz, for example, a first former part communication prediction model A is prepared for the lower first half bandwidth of 100 MHz, a first communication prediction model B is prepared for the second half bandwidth of 100 MHz, and the learning or the prediction for all communication in the 100 MHz is performed using the corresponding first former part communication prediction model A or B. The first latter part communication prediction model corresponds to more detailed RBs, and RBs at specific intervals such as 5 MHz or 10 MHz and the first latter part communication prediction model for each frequency position are prepared, to perform learning or prediction. Alternatively, outputs of a plurality of first former part communication prediction models in close groups and the first latter part communication prediction model may be used.

An experiment performed to demonstrate the effects of the present disclosure and results thereof will be described using FIGS. 12 to 16. The communication apparatus 1 used for the demonstration experiment was an autonomous mobile robot with LIDAR mounted thereon. The communication apparatus 1 can collect, as terminal information, self-position information, orientation information, speed information, and control information. Self-position is calculated from measurement results of odometry and LIDAR by Adaptive Monte Carlo Localization (AMCL) of a robot OS. A wireless LAN (IEEE 802.11ac) was used for wireless communication, and the amount of bits arriving in 0.2 seconds was measured as a throughput. Hereinafter, a result obtained by predicting a throughput after 1 second using a position (an X axis, a Y axis), an orientation, odometry (a speed on the X axis, a speed on the Y axis, and a rotational speed), and a past throughput (from the current time to 2 seconds in the past) obtained from the communication apparatus 1, which is a robot, will be described. The throughput was measured at every 0.2 seconds, and the position, the orientation, and the odometry were output at every 0.1 seconds. For utilization for prediction, information regarding the position, the orientation, and the odometry was subjected to averaging processing at every 0.2 seconds to reduce errors.

Figure 12:
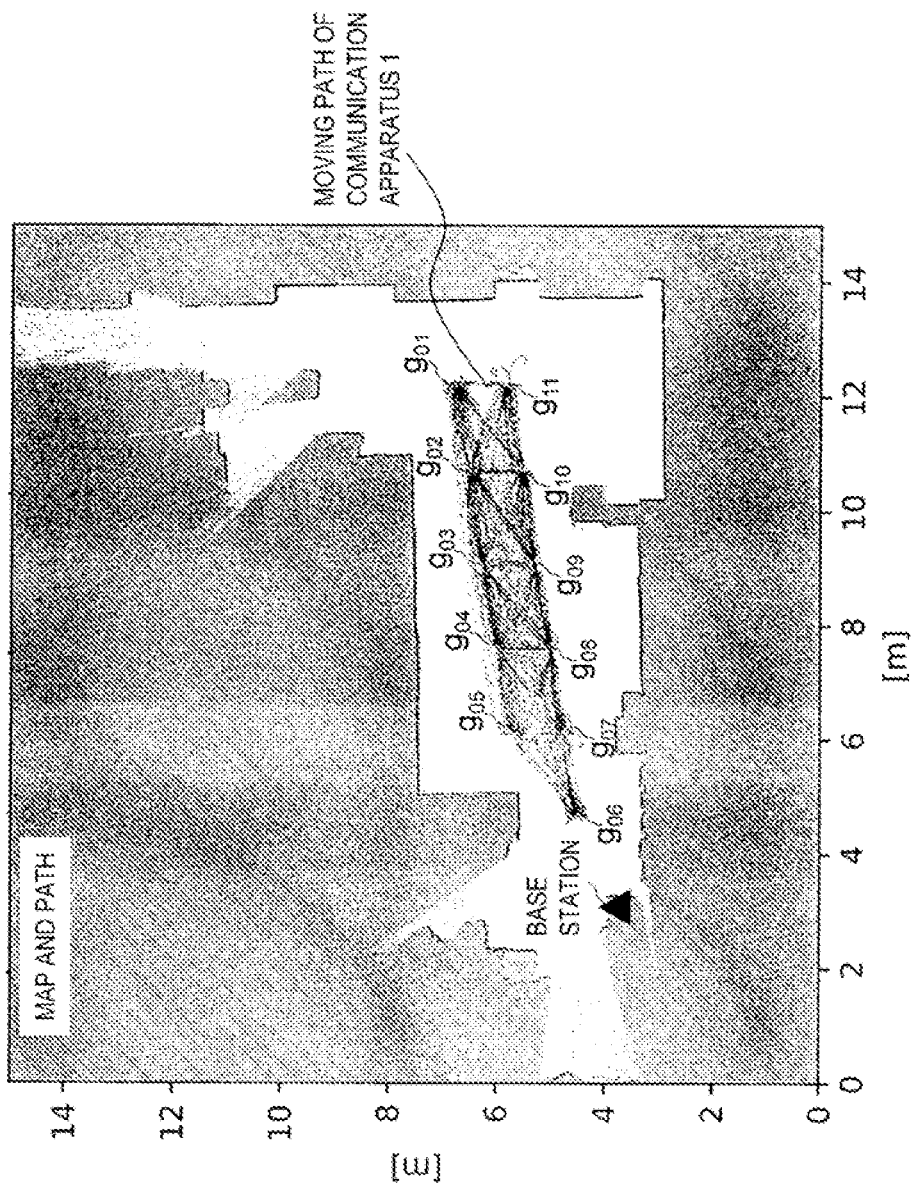
FIG. 12 illustrates map information of an indoor environment where a demonstration experiment has been carried out.

FIG. 12 is map information of an indoor environment where the demonstration experiment was carried out. The map information includes a moving path along which the communication apparatus 1 moved and the position of an external base station with which the communication apparatus 1 performed wireless communication. The communication apparatus 1, which is the mobile terminal, randomly selects eleven set goals $g_{01}$ to $g_{11}$ every time and operates between goals. Here, a data transfer speed (throughput) in 2 seconds was used as communication quality information.

Figure 13:
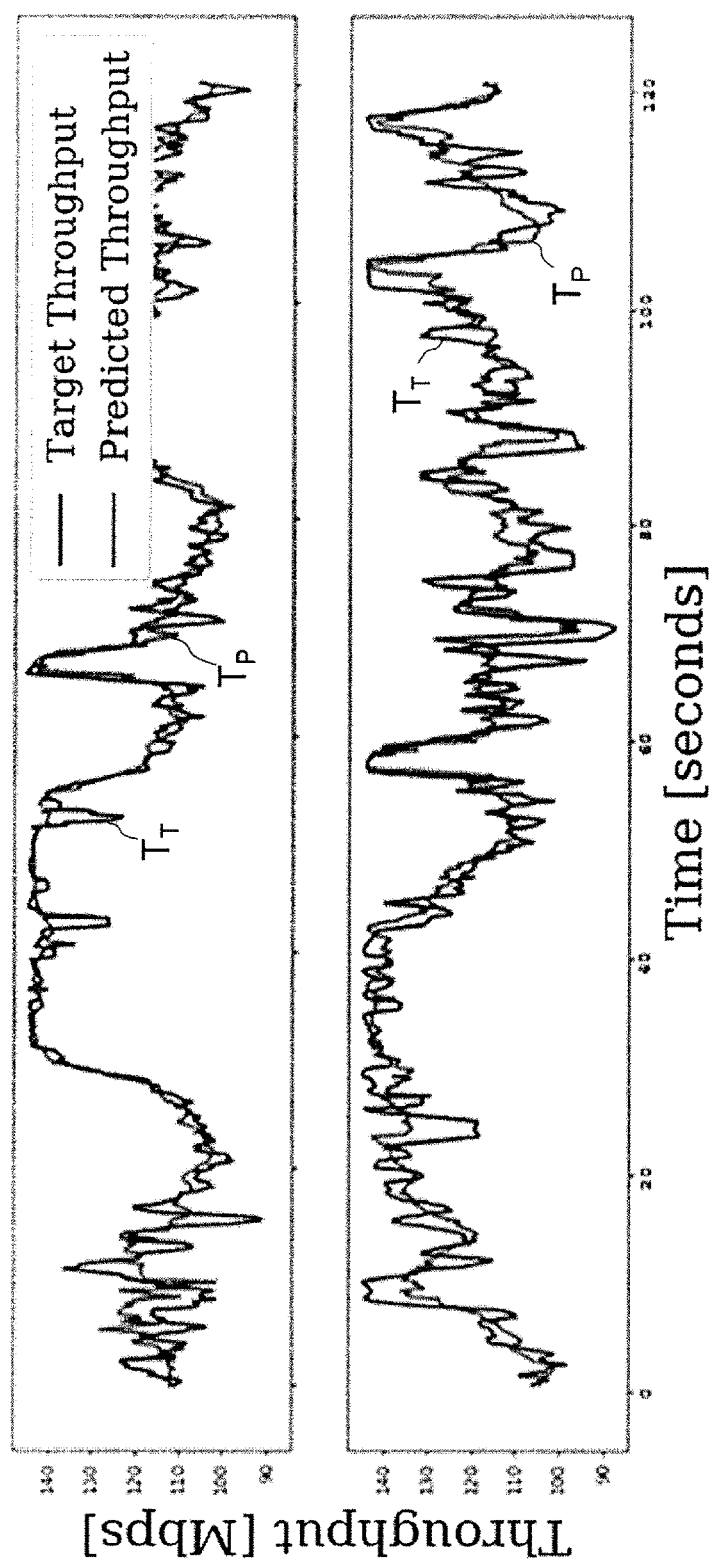
FIG. 13 illustrates an example of a result of predicting a throughput.
Figure 14:
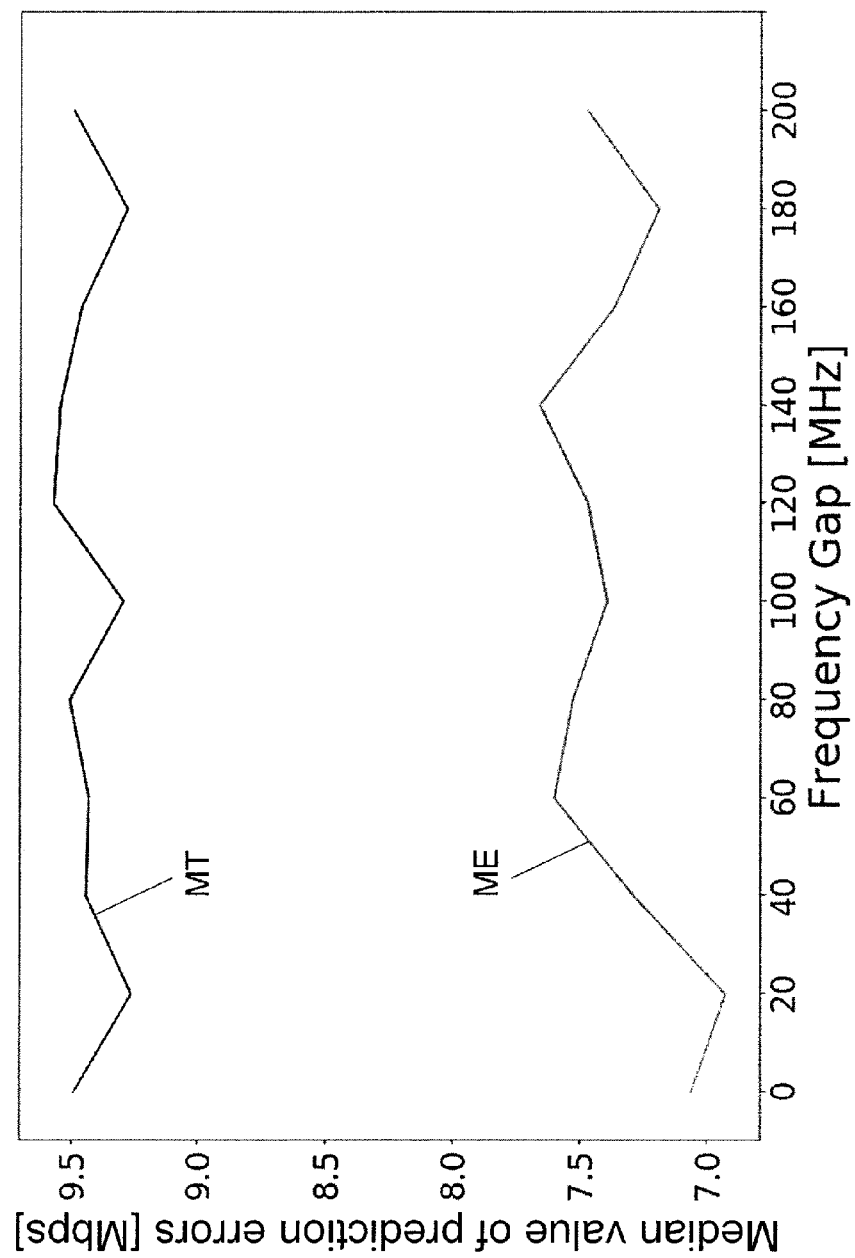
FIG. 14 illustrates an example of evaluation performed on a prediction result.
Figure 15:
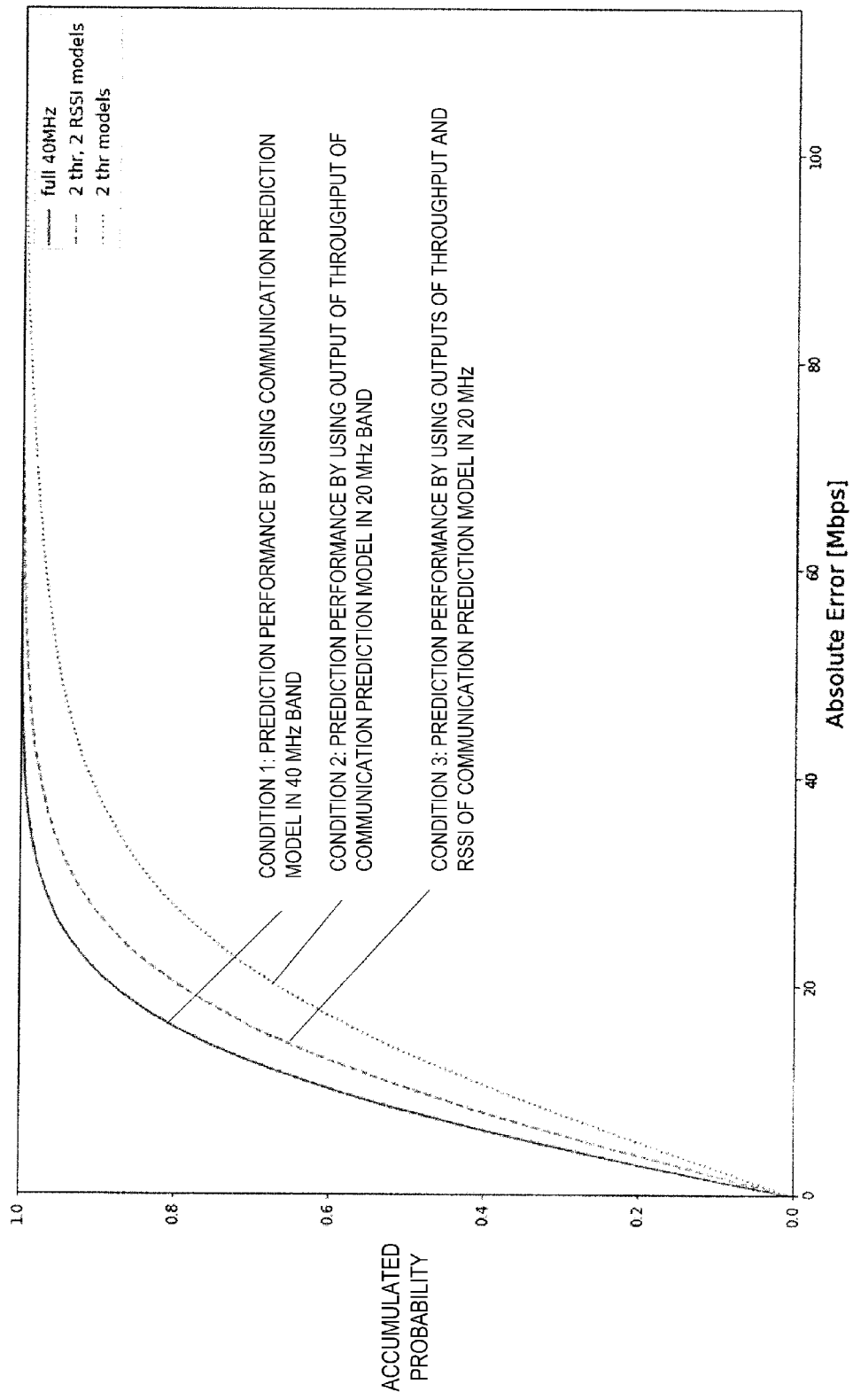
FIG. 15 illustrates an example in which communication quality is predicted for channels under different frequency conditions using a communication prediction model in a plurality of frequencies.

FIG. 13 illustrates a result obtained by the communication apparatus 1 that performed communication in a channel 136 in terms of an IEEE channel number in the wireless LAN predicting a throughput after 2 seconds using the communication prediction model generated with data in a channel 140 with a deviation of 20 MHz. In FIGS. 13 to 15, the communication prediction model was formed through random forest regression, the number of decision trees was set to 500, and the depth of leaves of the decision trees was not limited. As environment information, the position (the X axis, the Y axis), the orientation, the odometry (the speed on the X axis, the speed on the Y axis, and the rotational speed), and the past throughput (from the current time to 2 seconds in the past) were used. The horizontal axis represents time, the vertical axis represents a throughput, TP represents a result of prediction, and TT is an actually measured value. In a case in which both $T_P$ and $T_T$ overlap each other, this means the prediction achieves perfect matching. It is possible to confirm that the throughput after 2 seconds can be predicted with high accuracy regardless of utilization of the communication prediction models generated at different frequencies.

FIG. 14 shows a result of defining and measuring, as estimation errors, absolute values of difference between a predicted value of the throughput predicted as in FIG. 13 and an actually measured value and evaluating how medians of estimation errors are distributed with respect to a magnitude of frequency deviations between channels in which the communication prediction models were generated and channels using the communication prediction models. Environment information was split into a case in which the communication prediction models were generated using the position (X axis, the Y axis), the orientation, and the odometry (the speed on the X axis, the speed on the Y axis, and the rotational speed) (ME) and a case in which the communication prediction models were generated using the past throughput (from the current time to the 2 seconds in the past) (MT) and were then plotted. FIG. 14 shows an evaluation result of the bandwidth of 20 MHz.

In FIG. 14, data was generated in 100, 104, 108, 112, 116, 120, 124, 128, 132, 136, and 140 in terms of IEEE channel numbers, results in a case in which the communication prediction model generated in the channel 100 was used for communication prediction in the channels 100 to 140 and in a case in which the communication prediction model generated in the channel 140 was applied to the channels 140 to 100 were averaged, and medians of estimation errors with respect to frequency deviations between the channels were plotted. The results predicted from the environment information including the position, the orientation, and the odometry had smaller errors than those predicted from the past throughput information. In the case in which prediction was performed from the information regarding the position, the orientation, and the odometry, it can be confirmed that the estimation errors had a frequency difference slowly increasing in accordance with the frequency deviations of the channels to which the model was applied. Also, it can be ascertained that there are characteristic relationships depending on the utilization environment, and for example, a minimal value appeared with a deviation of 180 MHz in a certain environment. In the demonstration experiment, a similar experiment was carried out after one week or more to confirm that trends of the model similarity did not change. In a case in which a space where communication prediction was performed was known in advance, it is possible to select a model with higher accuracy by acquiring similarity data with respect to frequencies in advance. For example, the communication prediction model storage unit further stores information regarding similar frequencies and frequency bandwidth of the communication prediction models, and the communication prediction model generation unit uses the information. In this case, the communication prediction model generation unit may use the same communication prediction model for different frequencies, different frequency bands, and different channels.

This trend is considered to occur due to frequency dependency of radio wave propagation, and it is considerable that similarity between frequencies differs depending on an actual environment and a terminal operation. It is thus possible to evaluate similarity for each location or each moving condition of the terminal and to change the method to select the model to be used depending on the conditions. The thus obtained similarity of the communication prediction models with respect to frequencies is considered to be obtained for a transmission/reception environment condition of the communication device that is a target. Specifically, the relationship in FIG. 14 is obtained for the moving path of the mobile terminal in the experiment environment in FIG. 12, and different similarity is considered to be obtained for different locations, different moving conditions, and different base station positions.

Thus, it is considered to improve accuracy of prediction of communication quality by defining one or more environment conditions obtained using at least one of conditions regarding the position of the base station and the position, the orientation, and the speed of the mobile terminal, evaluating similarity of the communication prediction models between the frequency conditions for each environment condition, and determining, for each environment condition, a method in which the communication prediction model generation unit uses the models in the communication prediction model storage unit. For example, the communication prediction model generation unit can change the method for selecting the first communication prediction models to be called from the communication prediction model storage unit depending on the position of the terminal.

FIG. 15 illustrates an example in which communication quality is predicted for channels with different frequency conditions, using communication prediction models at a plurality of frequencies. The result obtained here demonstrates that the communication prediction model generation unit constructs the second communication prediction model from a plurality of first former part communication prediction models and first latter part communication prediction models and predict communication quality under a certain frequency condition as in FIG. 8.

Specifically, a result obtained by using first former part communication prediction models generated in two 20-MHz band channels, namely the channel 100 and the channel 104 and causing communication quality of a 40-MHz band channel constituted by the frequencies of the channel 100 and the channel 104 to be predicted is illustrated. At this time, the output of the first former part communication prediction model is set to condition 2 when only a throughput condition after a certain time is outputs, and set to a condition 3 when the throughput and RSSI after a certain time are output are output.

The condition 1 is distribution of absolute values of differences between actually measured throughputs and result of the prediction from information of 1 second before in a case in which information regarding the position (the X coordinate and the Y coordinate), the orientation (kz and w described above), the speed (the X-coordinate speed, the Y-coordinate speed, and the rotational speed) of the mobile terminal in the 40-Mhz channel and the throughput information are used as environment information to generate communication prediction models and communication prediction is carried out. According to the method of the condition 1, it is necessary to independently store communication prediction models for all the frequency channel conditions, which leads to large learning costs. On the other hand, a predicted value of a throughput output by using communication prediction models generated for the 20-Mhz band of the channel 100 and the channel 104, further learning a relationship between the two output throughput results and the throughput measured in 40 Mhz by the communication prediction model generation unit to generate the first latter part communication prediction model, and using the communication prediction model in the 20-Mhz band of the channel 100 and the channel 104 and the second communication prediction model is illustrated as the condition 2 by the dashed line.

Also, a prediction result obtained by the communication prediction models outputting predicted values of throughputs and RSSI and by using four input signals from the two communication prediction models to generate the second communication prediction model through a random forest was represented as the condition 3 by the broken line. It is possible to confirm that the random forest achieves performance closer to the case in which the communication prediction models are directly generated in 40 MHz as the output values of the communication prediction models in 20 MHz increase. It is possible to predict communication quality without constructing independent communication prediction models for each condition such as a bandwidth, by using a plurality of first former part communication prediction models in this manner.

Figure 16:
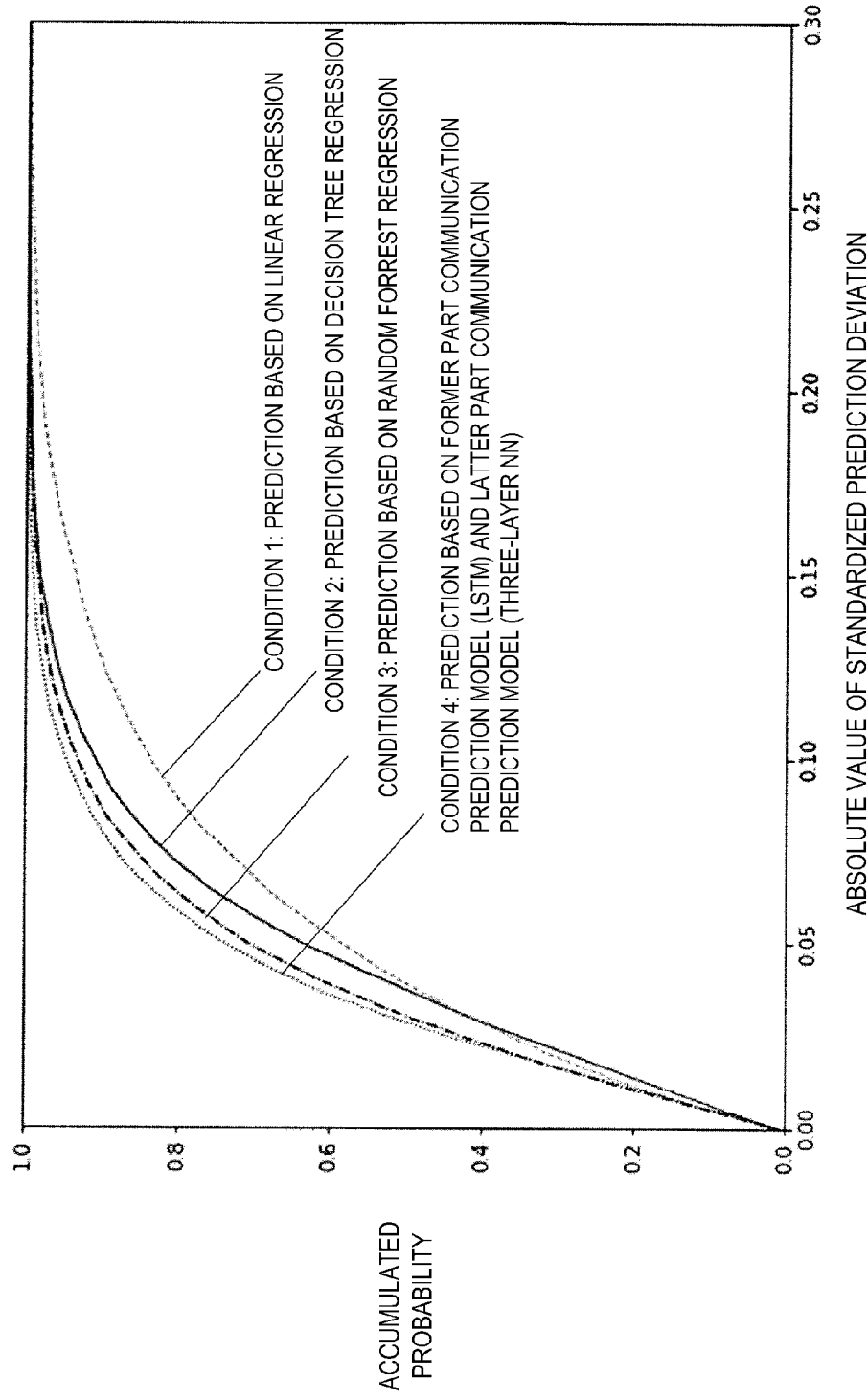
FIG. 16 is an example of a result of evaluating performance of communication quality prediction using various prediction methods.

Additionally, FIG. 16 illustrates a result of evaluating performance of prediction of communication quality in a case in which a hidden layer 16 and an LSTM block that performs inputs of 10 plots in the past are used as the first former part communication prediction models and a three-layer fully connected layer (a 16-input/8-output layer, an 8-input/8-output layer, and an 8-input/1-output layer) is used as the first latter part communication prediction model. This is a result of generating a model for predicting a throughput after 1 seconds in the 20-MHz bandwidth in the 112 channel in FIG. 3 and performing prediction. The input feature amounts are eight pieces of information including information regarding the position (the X coordinate, the Y coordinate), the orientation (kz and w described above), and the speed (the X-coordinate speed, the Y-coordinate speed, and the rotational speed) and the throughput information.

The conditions 1 to 3 are results of using deviations between prediction and actual throughputs obtained by linear regression, decision tree regression, and random forest regression, respectively, and the condition 4 is a result using the first former part communication prediction models and the first latter part communication prediction model. For the random forest of the condition 3, a model of 500 decision trees was used similarly to the process illustrated before and in FIG. 15. In the condition 4, the first former part communication prediction models were stored in advance as learned blocks common to the frequency channels 100 to 120ch in FIG. 3 with the LSTM block of the hidden layer 16, and the former part communication prediction models were handled as being completely fixed by performing learning without using actually measured data in 120ch that is a prediction target and without updating the weight and the bias for the prediction of the communication in 120ch. For the first latter part communication prediction model, learning was performed similarly to the conditions 1 to 3, and a combination with the first former part communication prediction models was used as a model for predicting communication in 120ch.

The horizontal axis in FIG. 16 represents an absolute value of deviation in an index standardized with an average value of throughputs. It is possible to confirm that prediction performance better than properties of random forest regression achieved through ensemble averaging using 500 decision trees can be obtained merely by learning the small latter part communication prediction model constituted of three layers if the configuration based on the condition 4 is used.

Other Embodiments

The communication apparatus 1 in the aforementioned embodiment may be realized by a computer. In this case, the communication apparatus 1 may be realized by recording a program for realizing each component of each apparatus on a computer-readable recording medium, loading the program recorded on the recording medium into a computer system, and executing the program.

Note that the "computer system" described here is assumed to include an OS and hardware such as a peripheral device. Also, the "computer-readable recording medium" means a portable medium such as a flexible disk, a magneto-optical disk, a ROM, or a CD-ROM or a storage device such as a hard disk incorporated in the computer system. Further, the "computer-readable recording medium" may also include a recording medium that dynamically holds a program for a short period of time, like a communication line in a case in which the program is transmitted over a network such as the Internet or a communication line such as a telephone line, or a recording medium that holds a program for a certain period of time, like a volatile memory inside a computer system serving as a server and a client in that case. Further, the above program may be a program for realizing some of the above-described components, may be a program that can realize the above-described components in combination with a program already recorded in the computer system, or may be a program realized by using hardware such as a programmable logic device (PLD) or field programmable gate array (FPGA).

Although the embodiment of the present invention has been described in detail with reference to the drawings, a specific configuration is not limited to the embodiment, and a design or the like in a range that does not depart from the gist of the present invention is included.

According to the present disclosure, environment information including at least a part of the position/the orientation/the speed/the configuration operation/control information generated by a communication apparatus, a communication counterpart of the communication apparatus, or both the communication apparatus and the communication counterpart and camera information/sensor information of the communication apparatus, the communication counterpart of the communication apparatus, or a device connected via a network to which the communication apparatus and the communication counterpart are connected is used to model a relationship with communication quality measured with external communication apparatuses with frequency channel utilization conditions, thereby producing communication quality. As frequency channels, multiple candidates can be present in terms of frequencies and frequency bandwidths. In a case in which sufficient data for constructing prediction models is not present for each frequency channel or in a case in which data is present but data effective for learning is not sufficiently present due to factors such as temporal variations, it is possible to enhance accuracy of prediction of communication quality by using representative prediction models available for a plurality of frequency channels, using prediction models in channels of other frequency conditions in which prediction models are present, or by using prediction models obtained by using transfer learning for representative prediction models. The present disclosure can thus provide a communication apparatus capable of predicting variations in communication quality in a wireless system in which there are a plurality of methods of using frequencies and frequency bandwidths.

REFERENCE SIGNS LIST 1, 1-100, 1-101, 1-102: Communication apparatus
1-0 Apparatus network
1-1-1, 1-1-N, 2-1: Communication unit
1-2, 2-2: Environment information generation unit
1-3, 2-3: Communication prediction model storage unit
1-4, 2-4: Communication prediction model generation unit
2-6: Communication prediction model learning unit
1-5: Communication prediction unit
1-201, 1-211, 1-221, 2-201, 2-291: Camera
1-202, 1-212, 1-222, 2-292: Sensor
2-900: Sensor
1-213, 1-223: Terminal information generator

The invention claimed is:

1. A system comprising:
a processor; and
a storage medium having computer program instructions stored thereon, when executed by the processor, perform to:
generate environment information including at least one piece of information from a plurality of pieces of information regarding a position, a posture, a motion, a control command, a camera, and a sensor of a terminal that performs wireless communication;
store a plurality of communication prediction models obtained by learning a relationship between the environment information and communication quality of wireless communication under a frequency channel condition corresponding to a frequency or a frequency bandwidth of wireless communication or both of the frequency and the frequency bandwidth;
select one or more communication prediction models to be used to predict communication quality of the terminal from among the plurality of communication prediction models stored in the communication prediction model storage unit and use the selected one or more communication prediction models to generate a communication prediction model corresponding to a frequency channel condition of wireless communication used by the terminal; and
input the environment information generated by the environment information generation unit to the communication prediction model generated by the communication prediction model generation unit and predict current or future communication quality of the terminal.

2. The system according to claim 1, wherein the computer program instructions further perform to
stores the communication prediction model in association with information regarding model accuracy, and
selects a communication prediction model that enhances model accuracy, from among the plurality of communication prediction models.

3. The system according to claim 1 or 2, wherein the computer program instructions further perform to
stores information regarding similar frequency channel conditions for the plurality of communication prediction models, and
selects the communication prediction models having similar frequency channel conditions from among the plurality of communication prediction models.

4. The system according to claim 1, wherein the computer program instructions further perform to
stores the communication prediction model by splitting into two parts that are a former part and a latter part, and
acquires two communication prediction models that are the former part and the latter part stored in the communication prediction model storage unit, based on a frequency channel condition for predicting communication quality and combines the two communication prediction models to generate the communication prediction model.

5. The system according to claim 4, wherein the computer program instructions further perform to:
generate the former part communication prediction model and the latter part communication prediction model,
determines, in advance, a former part communication prediction model and a latter part communication prediction model to be used for any frequency channel condition,
at least any of a setting for preventing an updating coefficient from decreasing, a setting for preventing a regularization coefficient from increasing, and a setting for preventing a condition such as a weight, a bias, or a decision tree from being changed is set in the former part communication prediction model, and
in the latter part communication prediction model, an updating coefficient that is same as or greater than an updating coefficient for the former part communication prediction model is used to set to reduce or not to user a regularization coefficient, and a learning load is set lower than a learning load for the former part communication prediction model.

6. The system according to claim 1 wherein the computer program instructions further perform to:
generate the former part communication prediction model and the latter part communication prediction model,
trains the former part communication prediction model using measurement information including communication quality and environment information under a plurality of frequency channel conditions, and
trains the latter part communication prediction model using measurement information including communication quality and environment information obtained under more detailed frequency channel conditions than the plurality of frequency channel conditions that have used for training the former part communication prediction model.

7. An apparatus comprising:
an environment information generation unit configured to generate environment information including at least one piece of information from a plurality of pieces of information regarding a position, a posture, a motion, a control command, a camera, and a sensor of a terminal that performs wireless communication;
a communication prediction model storage unit configured to store a plurality of communication prediction models obtained by learning a relationship between the environment information and communication quality of wireless communication under frequency channel conditions corresponding to a frequency or a frequency bandwidth of wireless communication or both of the frequency and the frequency bandwidth;
a communication prediction model generation unit configured to select one or more communication prediction models to be used to predict communication quality of the terminal from among the plurality of communication prediction models stored in the communication prediction model storage unit and use the selected one or more communication prediction models to generate a communication prediction model corresponding to a frequency channel condition of the wireless communication used by the terminal; and
a communication prediction unit configured to input the environment information generated by the environment information generation unit to the communication prediction model generated by the communication prediction model generation unit and predict current or future communication quality of the terminal.

8. A method comprising:
by an environment information generation unit, generating environment information including at least one piece of information from a plurality of pieces of information regarding a position, a posture, a motion, a control command, a camera, and a sensor of a terminal that performs wireless communication;
by a communication prediction model generation unit, referring to a plurality of communication prediction models obtained by learning a relationship between the environment information and communication quality of wireless communication under a frequency channel condition corresponding to a frequency or a frequency bandwidth of wireless communication or both of the frequency and the frequency bandwidth, selecting one or more communication prediction models to be used to predict communication quality of the terminal from among the plurality of communication prediction models, and using the selected one or more communication prediction models to generate a communication prediction model corresponding to a frequency channel condition of the wireless communication used by the terminal; and
by a communication prediction unit, inputting the environment information generated by the environment information generation unit to the communication prediction model generated by the communication prediction model generation unit, and predicting current or future communication quality of the terminal.

* * * * *